(12) United States Patent
Faxvog et al.

(10) Patent No.: US 9,077,172 B2
(45) Date of Patent: Jul. 7, 2015

(54) SELF-TESTING FEATURES OF SENSING AND CONTROL ELECTRONICS FOR A POWER GRID PROTECTION SYSTEM

(71) Applicant: Emprimus, LLC, St. Louis Park, MN (US)

(72) Inventors: Frederick R. Faxvog, Long Lake, MN (US); Wallace Jensen, Centerville, MN (US); Terrance R. Noe, Sebastopol, CA (US); Craig Eid, Santa Rosa, CA (US); David Blake Jackson, Excelsior, MN (US); Greg Fuchs, River Falls, WI (US); Gale Nordling, Excelsior, MN (US)

(73) Assignee: Emprimus, LLC, St. Louis Park, MN (US)

( * ) Notice: Subject to any disclaimer, the term of this patent is extended or adjusted under 35 U.S.C. 154(b) by 92 days.

(21) Appl. No.: 13/899,078

(22) Filed: May 21, 2013

(65) Prior Publication Data

US 2013/0308229 A1     Nov. 21, 2013

Related U.S. Application Data

(60) Provisional application No. 61/649,647, filed on May 21, 2012.

(51) Int. Cl.
*H02H 3/00* (2006.01)
*H02H 7/04* (2006.01)
*H02H 3/33* (2006.01)

(52) U.S. Cl.
CPC .............. *H02H 7/04* (2013.01); *H02H 3/331* (2013.01); *H02H 3/338* (2013.01)

(58) Field of Classification Search
USPC ................................................. 361/35, 42, 62
See application file for complete search history.

(56) References Cited

U.S. PATENT DOCUMENTS

| | | | |
|---|---|---|---|
| 3,169,723 A | 2/1965 | Walden | |
| 3,916,261 A | 10/1975 | Zylstra et al. | |
| 4,153,891 A | 5/1979 | McNutt | |
| 4,297,738 A | 10/1981 | Lee | |
| 4,654,806 A | 3/1987 | Poyser et al. | |
| 5,136,453 A | 8/1992 | Oliver | |

(Continued)

OTHER PUBLICATIONS

Boldue, L. et al., "Development of a DC Current-Blocking Device for Transformer Neutrals," IEEE Transactions on Power Delivery, vol. 20, No. 1, pp. 163-168 (Jan. 2005).

(Continued)

*Primary Examiner* — Danny Nguyen
(74) *Attorney, Agent, or Firm* — Merchant & Gould P.C.

(57) ABSTRACT

Systems and method for detecting potentially harmful harmonic and direct current signals at a transformer are disclosed. One system includes a protection circuit electrically connected to a transformer neutral, the transformer electrically connected to a power grid, the protection circuit including a DC blocking component positioned between the transformer neutral and ground and one or more switches selectively actuated to form a path between the transformer neutral and ground in the event of unwanted DC current at the transformer neutral. The system also includes a control circuit electrically connected to the protection circuit and positioned to selectively actuate the switches based on observed conditions within the protection circuit. The system further includes a plurality of test connections disposed within the protection circuit and useable to test electrical properties of the protection circuit.

18 Claims, 15 Drawing Sheets

(56) References Cited

U.S. PATENT DOCUMENTS

| | | | |
|---|---|---|---|
| 5,179,489 | A | 1/1993 | Oliver |
| 5,390,064 | A | 2/1995 | Russo |
| 5,684,466 | A | 11/1997 | Keating et al. |
| 5,751,530 | A * | 5/1998 | Pelly et al. ............... 361/56 |
| 5,930,099 | A | 7/1999 | Legro et al. |
| 5,982,276 | A | 11/1999 | Stewart |
| 7,529,069 | B1 | 5/2009 | Weems, II et al. |
| 8,537,508 | B2 | 9/2013 | Faxvog et al. |
| 2001/0040458 | A1 | 11/2001 | MacBeth et al. |
| 2007/0217103 | A1 | 9/2007 | AF Klercker Alakula et al. |
| 2008/0232006 | A1 | 9/2008 | Ramirez et al. |
| 2009/0147415 | A1 * | 6/2009 | Lazarovich et al. ......... 361/42 |
| 2010/0046129 | A1 | 2/2010 | Mikrut |
| 2010/0097734 | A1 | 4/2010 | Birnbach |
| 2010/0195256 | A1 | 8/2010 | Birnbach |
| 2012/0019962 | A1 | 1/2012 | Faxvog et al. |
| 2012/0019965 | A1 * | 1/2012 | Faxvog et al. ............... 361/42 |

OTHER PUBLICATIONS

International Search Report and Written Opinion for PCT/US2011/044536 mailed Mar. 27, 2012.

International Search Report and Written Opinion for PCT/US2011/044658 mailed Jul. 12, 2012.

Invitation to Pay Additional Fees with Partial International Search cited in International Application No. PCT/US2011/044536 mailed Nov. 21, 2011.

Superpower Inc. ID#88 (SP-145), 10 pages, Aug. 10, 2001.

\* cited by examiner

SELF-TESTING FEATURES OF SENSING AND CONTROL ELECTRONICS FOR A POWER GRID PROTECTION SYSTEM

CROSS-REFERENCE TO RELATED APPLICATIONS

This application claims priority to U.S. Provisional Patent Application No. 61/649,647, filed on May 21, 2012, the disclosure of which is hereby incorporated by reference in its entirety.

TECHNICAL FIELD

The present disclosure relates generally to a high voltage transformer protection system, in particular, the present disclosure relates to self-testing features of a control system that could be used to protect high voltage transformers, power equipment, electronics, and computing systems.

BACKGROUND

Electrical equipment, and in particular electrical equipment operating using alternating current, is subject to varying input signals and conditions. In typical arrangements, alternating current devices in the United States expect to receive a 60 Hz power line source (or 50 Hz in Europe) having a predetermined magnitude (e.g., 120 Volts in North America or 240 Volts in Europe). Although these power sources may vary somewhat, devices made for use with a particular current can typically handle some slight variation in the power signal received.

In some cases, a power signal can vary widely due to external conditions or harmonics. External conditions that may cause harmonics or quasi-direct currents (DC) on a power signal include geomagnetic storms or effects of electrical equipment. Such events can cause the input voltage and current (and resulting power) of a power signal to vary dramatically, causing a potential for damage to the electrical equipment receiving that power signal. Geomagnetic storms or the E3 pulse associated with a high altitude electromagnetic pulse (HEMP) can induce DC or quasi-DC currents called Geomagnetic Induced Currents (GIC) in high voltage power generation, transmission, and distribution system components, i.e. power transmission lines and power transformers. These DC currents can cause half cycle saturation in power transformer cores which in turn can result in excessive reactive power losses, heating, damage and/or failure of such a transformer, particularly in older or poorly maintained transformers. In addition, the half cycle saturation can cause the generation of harmonics of the primary frequency (50 or 60 Hz). This harmonic content can cause power system relays to trigger, which can decouple required compensation components. This in turn can result in the collapse of local or wide area portions of a power grid.

Over approximately the last two decades, several suggested approaches for reducing GIC or HEMP (E3) induced currents in power systems have been proposed. These solutions generally take one of a few forms. A first class of solutions uses a capacitive circuit to simultaneously provide the AC grounding path and a block for the induced DC currents. These solutions generally include a set of switches that allow switching between a normal grounded transformer connection and grounding through the capacitive circuit. These solutions can allow for unintentionally open grounding connections to the transformer neutral, or require expensive electronics for handling ground fault conditions. These capacitive circuit solutions may require readjustment of power system relay settings, as compared to current operational parameters.

A second class of solutions generally includes the continuous use of active components used to reduce potentially damaging GIC events from DC or quasi DC currents in the transformer neutral to ground connection. These solutions typically require expensive power equipment, and are constantly active, such that any failure would render these systems unreliable. Additionally, when this solution is initially installed in the power system many relays/breakers would require readjustments of their settings.

A third class of solutions generally uses a resistive approach in which fixed value resistors are used to continuously reduce the DC current in the neutral to ground connection of a transformer; however in these approaches, the resistor typically must have a high resistance value and would only reduce, not eliminate the DC or quasi DC neutral current. Additionally, during the installation of these classes of solutions a readjustment of the power system's relay settings may be required. As such, there exists no solution that provides a reliable, low cost protection circuit compatible with current power delivery systems. Furthermore, there exists no reliable, testable system for controlling such a protection system that would not require substantial on-site maintenance.

Several suggested approaches for reducing or blocking GIC or E3 induced currents in power systems have been proposed. However, none of these systems provides a comprehensive arrangement for addressing the various types of potentially harmful decisions that may occur. In particular, there has been no known approach that uses a sensing and control system that first senses the presence of GIC or E3 events then switches a DC blocking device to protect high voltage transformers.

For these and other reasons, improvements are desirable.

SUMMARY

In accordance with the following disclosure, the above and other issues may be addressed by the following:

In a first aspect, a system includes a protection circuit electrically connected to a transformer neutral, the transformer electrically connected to a power grid, the protection circuit including a DC blocking component positioned between the transformer neutral and ground and one or more switches selectively actuated to form a path between the transformer neutral and ground in the event of unwanted DC current at the transformer neutral. The system also includes a control circuit electrically connected to the protection circuit and positioned to selectively actuate the switches based on observed conditions within the protection circuit. The system further includes a plurality of test connections disposed within the protection circuit and useable to test electrical properties of the protection circuit.

In a second aspect, a method includes transmitting one or more electrical signals from a protection circuit to a remote system, the protection circuit electrically connected between a transformer neutral of a transformer in a power grid and ground, wherein the remote system periodically assesses operation of the protection circuit based on the one or more electrical signals. The method further includes receiving at a control circuit electrically connected to the protection circuit one or more commands from the remote system to actuate one or more switches in the protection circuit, thereby testing an alternative configuration of the protection circuit.

In further aspects, a sensing and control system for use with an electrical protection circuit is disclosed. The system includes a plurality of detection components configured to detect damaging harmonics and DC or quasi-DC currents on a transformer power line or EMP and IEMI environmental events. These detection components may include, but are not limited to: a harmonic analyzer, a shunt resistor electrically connected between the transformer neutral and ground, a Hall Effect current sensor electrically connected between the transformer neutral and ground, and an electromagnetic field detector positioned external to the shielded enclosure. The system further includes a plurality of threshold detectors configured to compare a signal from a detection component to an adjustable predetermined signal, wherein the threshold detector outputs a signal indication to a controller when the signal from the detection component exceeds the predetermined signal value. The controller, also positioned within the shielded enclosure, is configured to open a normally closed switch in an external protection circuit upon receiving a signal indication from at least one of the plurality of threshold detectors. The controller further includes a control input wherein the control input is received from a power system operator remote from the shielded enclosure. The controller is further configured to execute one or more self-test procedures configured to simulate potentially damaging signals to determine whether the system is functioning properly.

In some embodiments, the controller is configured to open the normally closed switch in response to receipt of a signal from the power system operator remote from the shielded enclosure (e.g., a control system). The system optionally includes a shielded enclosure configured to protect electrical components from electromagnetic pulse (EMP) and/or Intentional Electromagnetic Interference (IEMI). In such optional arrangements, filters are positioned along the inner periphery of the shielded enclosure, configured to prevent high frequency, high power electromagnetic signals from entering the shielded enclosure and potentially damaging electrical components.

In still further aspects, a sensing and control system for use with an electrical protection circuit is disclosed. The system includes a shielded enclosure configured to protect electrical components from electromagnetic pulse (EMP) and/or Intentional Electromagnetic Interference (IEMI). Filters are positioned along the inner periphery of the shielded enclosure, configured to prevent high frequency, high power electromagnetic signals from entering the shielded enclosure and potentially damaging electrical components. The system further includes at least one harmonic analyzer positioned within the shielded enclosure, configured to detect damaging harmonics on a transformer power line. The system further includes at least one threshold detector configured to compare a signal from a harmonic analyzer to an adjustable predetermined signal, wherein the threshold detector outputs a signal indication to a controller when the signal from the harmonic analyzer exceeds the predetermined signal value. The controller, also positioned within the shielded enclosure, is configured to open a normally closed switch in an external protection circuit upon receiving a signal indication from at least one of the threshold detectors. The controller further includes a control input wherein the control input is received from a power system operator remote from the shielded enclosure.

In a still further aspect, a system for detecting potentially damaging electromagnetic signals including high direct currents in a transformer neutral and harmonics of a primary power frequency is disclosed. The system includes a plurality of detection components electrically connected to one or more electrical signal lines leading from one or more connection points on a power grid. The system also includes a controller positioned within an interior volume of an electromagnetically shielded enclosure. The controller is configured to receive an output from each of the plurality of detection components, the controller including a plurality of remotely-set test thresholds, and configured to drive at least one external component in response to sensing a signal from one of the plurality of detection component of a detected harmonic or direct current signal above a respective one of the plurality of remotely-set test thresholds.

In a further aspect, a method for controlling an electrical protection circuit configured to detect potentially damaging electromagnetic signals in a transformer neutral is disclosed. The method includes receiving a plurality of detector signals at a controller, the controller housed within an electromagnetically-shielded enclosure, and the detector signals including a harmonic detector signal and a direct current detector signal. The method further includes sampling each of the plurality of detector signals to detect a peak value over a predetermined period for each of the plurality of detector signals. The method further includes comparing each of the peak values to a corresponding remotely-set test threshold associated with that signal type, and, based on that comparison, generating one or more alarms if the remotely-set test threshold is exceeded, and communicating at least the one or more alarms to a remote system.

DETAILED DESCRIPTION

Figure 1:
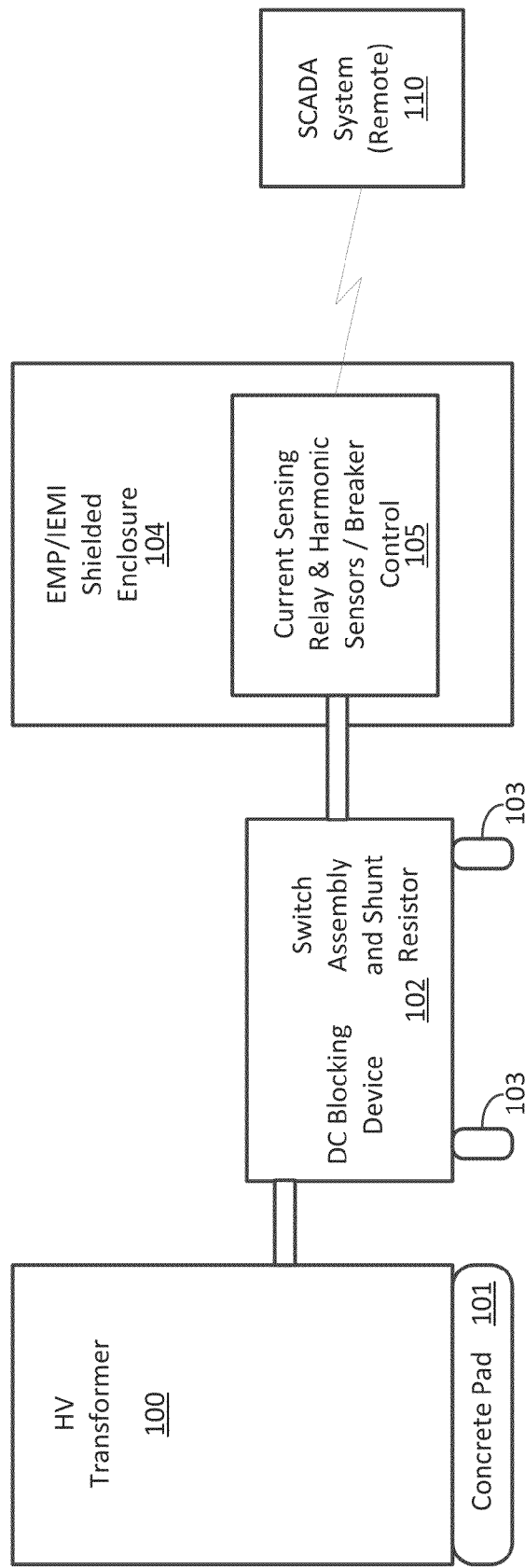
FIG. 1 is a schematic front view of the sensing and control electronics connected to an example embodiment of a high voltage transformer environment.

In general, the present disclosure describes systems and methods for sensing damaging DC or quasi-DC currents which cause harmonic content on a power line, and controlling a switch assembly in an electrical protection circuit to protect high voltage transformers and other electrical equipment from the damaging DC or quasi-DC currents. Large DC neutral currents and harmonic voltages can be the result of geomagnetic (solar) storms, high altitude electromagnetic E3 pulse (HEMP-E3) or other electrical equipment, such as switching power supplies, arc welding equipment, plasma cutting, electric discharge machining equipment, arc lamps, etc., which are on the same power grid or local power circuit. Overall, the present disclosure describes methods and systems for sensing the harmonic content of a 50 Hz or 60 Hz power line source, and potentially damaging neutral DC currents, and controlling equipment to be switched to a protective mode of operation in case such harmonics or DC currents are detected. In some embodiments, the present disclosure relates to methods and systems for self-testing circuitry used to protect against such DC and quasi-DC currents as well as the control systems used to manage operation of that circuitry.

Protection of high voltage power systems from GIC (solar storms) and EMP E3 pulses are achieved using a system that senses damaging DC currents on a power line signal and external high electromagnetic events. The sensing systems disclosed herein provide electronics used to detect the presence of DC currents in the neutral connection of high and extra high voltage power transformers. The sensing system may additionally include a harmonic, or total harmonic, distortion (HD or THD) sensor that senses harmonics on the power line signal which are caused by a DC current and half wave saturation in the transformer windings. The sensing systems may additionally include an electromagnetic field detector that detects external electromagnetic pulse (EMP) events. The sensing systems may additionally include a detector that computes current through a shunt resistor or a Hall Effect current sensor that is electrically connected to the transformer neutral.

The present disclosure further includes a control system that sends signals to an electrical protection circuit to test and control the operation of a switch assembly in a DC blocking assembly contained in the electrical protection circuit. The control system controls a switch in an electrical protection circuit to protect high voltage transformers from geomagnetic and EMP (E3 pulse) induced currents. A DC blocking component (including one or more capacitors, resistors or combinations thereof) is hard wired in the electrical protection circuit to provide an uninterruptable AC grounding path for the high power systems, for example to the neutral of "Y" configured high transformers or autotransformers. Under normal operation, a second parallel grounding path provides a low impedance, standard grounding path through a closed switch assembly. In some embodiments discussed herein, at least a testing portion of the system can be located either within control circuitry, or within a supervisory control and data acquisition (SCADA) system monitoring the circuitry.

FIG. 1 is a schematic front view of example electrical equipment protected according to the features of the present disclosure, and a physical layout of certain components of the present disclosure. In the embodiment shown, a piece of electrical equipment, shown as a high-voltage transformer 100, is electrically connected to an electrical protection circuit 102. The electrical protection circuit 102 can, for example, include at least a portion of the devices described below, according to the embodiments shown in FIGS. 2-9. The high voltage transformer 100 is typically mounted on a concrete pad. An electrical protection circuit 102 is electrically connected to the high voltage transformer 100 as discussed above, encased in a housing, and placed on electrically grounded supports 103. In addition to protecting against GIC events, all control electronics (semiconductor devices) are enclosed in an EMP/IEMI shielded and electrically filtered enclosure 104 is electrically connected to the electrical protection circuit 102 and high voltage transformer 100, and includes sensing and switch control circuitry 105. It should be noted that without the shielded and filtered enclosure 104 the system is capable of protect transformers against GIC and EMP E3 events but not against EMP E1, E2, and IEMI pulse threats.

In some embodiments, the sensing and switch control circuitry 105 is communicatively connected to a remote supervisory control and data acquisition (SCADA) system 110, which can monitor operation of the sensing and switch control circuitry 105, and can provide remote controls over certain functionality of that circuitry. For example, and as discussed further below, in some embodiments, the SCADA system 110 can monitor operation of the electrical protection circuit 102 and sensing and switch control circuitry 105 associated with one or more transformers 100.

Figure 2:
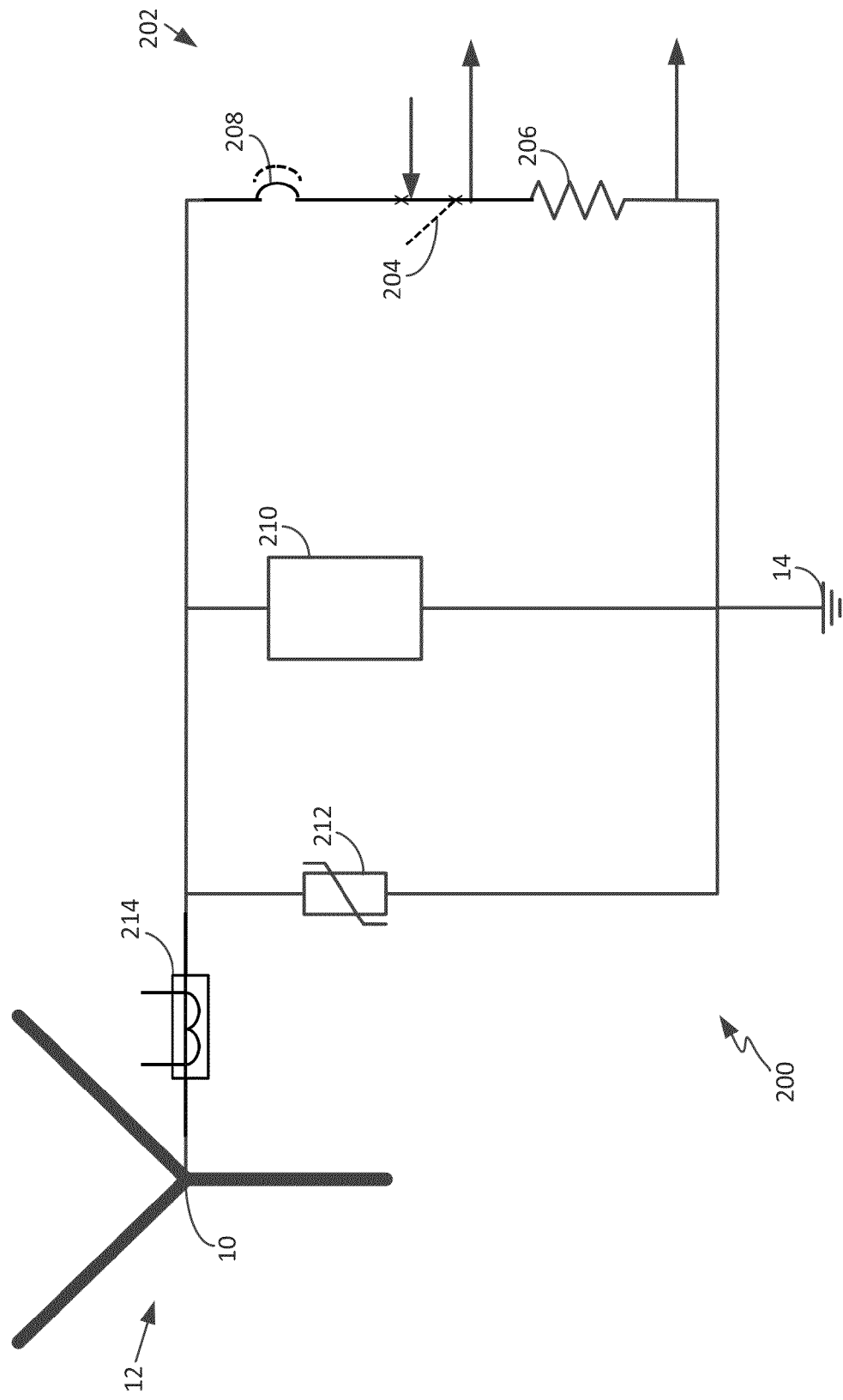
FIG. 2 illustrates an example embodiment of an electrical protection circuit external to the control system of the present disclosure.
Figure 3:
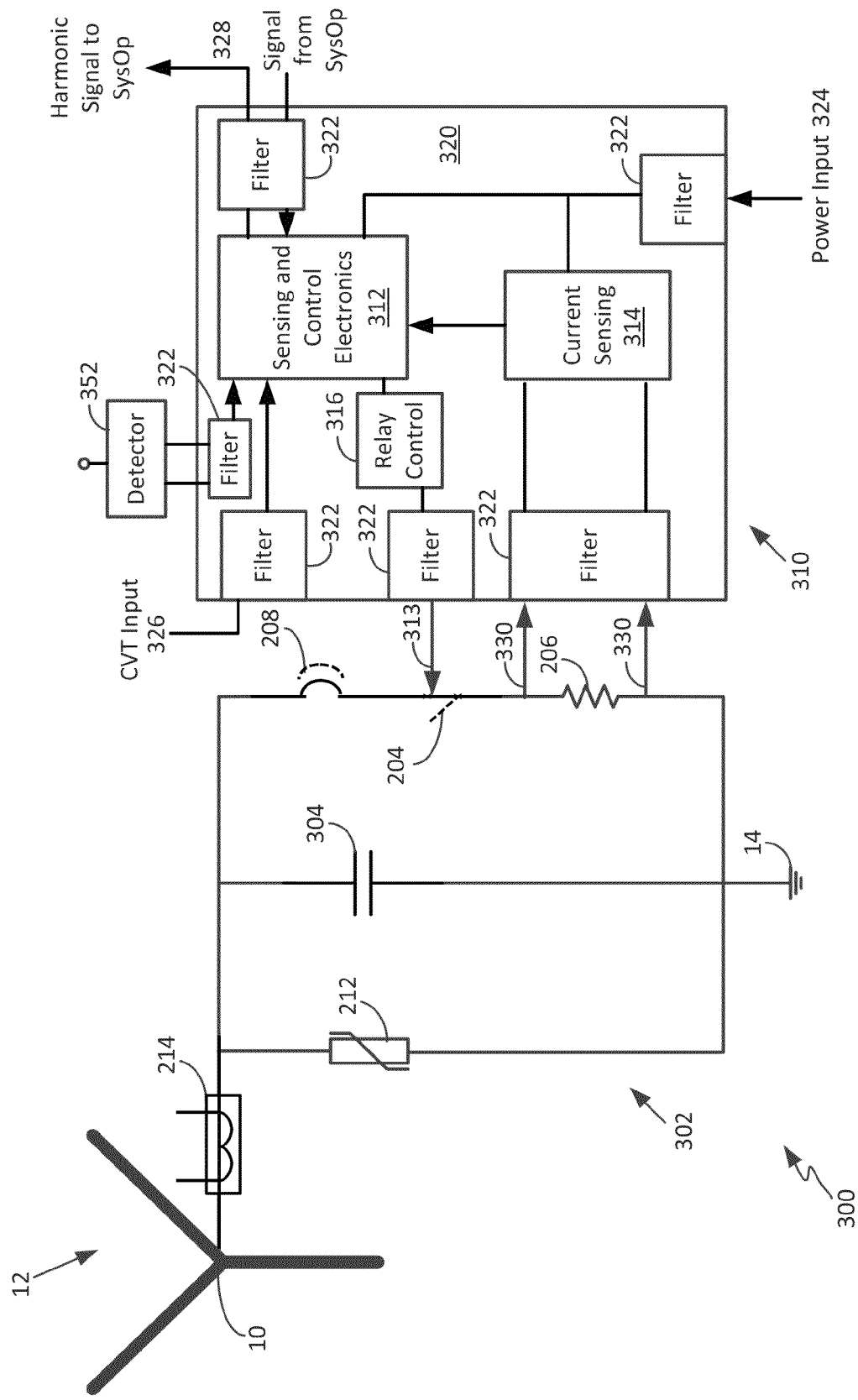
FIG. 3 illustrates an example embodiment of a sensing and control system connected to a continuous grounding system including an example embodiment of an electrical protection circuit.

In certain embodiments, the electrical protection circuit 102 includes the switch assemblies and DC blocking components discussed in FIGS. 2-3, while the control system 104 contains sensing and switch actuation circuitry as illustrated in FIGS. 3-10, below. Self test features are discussed in connection with FIGS. 10-15. However, other arrangements of components for an electrical protection device can be provided.

Referring now to FIG. 2, a first generalized embodiment of an electrical protection circuit 200 useable with the sensing and control electronics of the present disclosure is shown. The circuit 200 generally is connected between a transformer neutral 10 of a transformer 12 (shown as Y-transformer in the embodiment shown) and a ground 14. The electrical protection circuit 200 includes a switch assembly 202 including an electrically controlled switch 204 connected between the transformer neutral 10 and ground 14. A shunt resistor 206 can be connected between the switch 204 and ground 14, which can be used to sense DC current passing between the transformer neutral 10 and ground 14. In certain embodiments, the shunt resistor 206 would typically have a low resistance, on the order of a few milliohms, to allow for a low impedance ground connection through the switches. In another embodiment, the shunt resistor 206 could be replaced by a Hall Effect current sensor or other non-contact current sensor. Additionally, an electrically-controlled high voltage grounding switch 208 can be connected between the transformer neutral 10 and the switch 204, for example to protect the switch 204 from high voltages during a ground fault event. In some embodiments, the ground 14 can be connected to a station ground grid, while in other embodiments it can be connected to the transformer housing which is in turn grounded.

The switch 204 can be any of a variety of fast acting electrically-controlled switches, such as a high voltage circuit breaker switch. In the embodiment shown, the switch 204 is a normally-closed connection which can be opened rapidly via an electrical control input. Example sensing and control circuitry that can be connected to the control input is discussed further in connection with FIG. 3-10, below.

A DC blocking component 210 is connected in parallel with the switch assembly 202 between the transformer neutral 10 and the ground 14. As further explained in the examples below, the DC blocking component 210 can include one or more direct current blocking devices (e.g., capacitors or resistors) capable of inserting some blocking of a current path between ground 14 and the transformer neutral 10, to prevent damaging DC or quasi DC ground currents in the transformer neutral 10, which would in turn cause possible damage to the transformer 12. Depending on the specific application, either a capacitive or resistive (or some combination thereof) blocking device 210 could be employed in the protection circuit 302. Furthermore, in certain embodiments, the DC blocking component 210 is hard wired to the ground 14, therefore providing an AC ground for the transformer (or other power component) even if the switches 204 and 208 inadvertently malfunction.

In normal operation, the transformer neutral 10 is grounded through the switch assembly 202. That is, the switch assembly 202, including switch 204 and high voltage grounding switch 208, is normally in a closed position. This corresponds to the standard grounding configuration used by utilities; consequently, a grounding system such as is disclosed herein does not require readjustments to the utility electrical equipment to which it is attached prior to use. In this first mode of operation, the DC blocking component 210 is not energized, because the switching assembly creates a short around it. If a ground fault is detected while operating in this normal operational mode (no GIC), the grounding through the switch assembly will handle the ground fault current until the power system relays isolate the faulted equipment. When the presence of either high power harmonics or a quasi DC current in the neutral to ground connection is detected, the switch assembly is opened by the GIC sensing and control electronics. In this second mode of operation the DC blocking component 210 provides the AC grounding for the transformer neutral. This mode of operation protects against DC or quasi DC currents associated with either GIC or EMP E3 events. This GIC protective mode remains operational until a power system operator at a remote location declares the event to be over and re-closes the switch assembly 202.

In some embodiments, to account for an extremely unlikely event that a GIC and ground fault would occur simultaneously, a surge arrester 212, sometimes known as a varistor or a MOV (metal oxide varistor) or other such surge arresting device, would trigger to protect the blocking components 210. The switch assembly 208 would then be reclosed by a signal from a relay detecting fault current through the transformer neutral current transformer 214 which in turn will trigger the high voltage switch 208 to reclose. Therefore the surge arrester 212 provides the initial grounding within one cycle of the ground fault and until the switch assembly 202 can be reclosed. It is noted that the probability of this simultaneous event (GIC and ground fault) is so small that in practice it may never occur in the lifetime of the system.

To reduce the cost of the surge arrester 212, it may be desirable to use a low cost surge arrester that is a sacrificial device, such that it only protects for one event and will then require replacement. After the surge arrester has been sacrificed, it by its design becomes a short circuit to ground. A second option is to incorporate additional surge arresters in the initial installation with switches such that if the first arrester is sacrificed a second can be switched in as a replacement as needed. A third option is to incorporate a very heavy duty surge arrester in the initial installation that will guarantee that the surge arrester will withstand many ground fault events without failing.

By opening the switch assembly, the DC blocking component 210 shown in FIG. 2 provides the AC grounding path for the transformer neutral 10, while at the same time blocks or reduces the DC or quasi DC induced by a geomagnetic storm or EMP E3 event. Blocking the DC both protects the transformer 12 from entering half cycle saturation which in-turn can cause transformer excessive reactive power losses, overheating, damage or even failure. Additionally, blocking the DC also prevents the generation of harmonics in the power system which in-turn can prevent the tripping of power relays, the disconnection of power compensation components, excessive reactive power burden and potentially the collapse of either small or large portions of the power grid.

Further, to increase the reliability of the DC blocking component 210, either a parallel bank of multiple capacitors or resistors could be used such that if one or more of these capacitors or resistors fail the others would still be available as blocking components.

Additionally, and as further disclosed below, to protect against the E1 and E2 portions of an electromagnetic pulse (EMP) and/or Intentional Electromagnetic Interference (IEMI), all the sensitive sensing and control electronics of such a system can be placed in a shielded and electrically filtered enclosure, such as the enclosure containing control system 104 of FIG. 1. All components which are not housed in the shielded enclosure do not contain sensitive semiconductor electronics and hence would survive either an EMP or IEMI event. In an alternative embodiment where the sensing and control electronics are not placed in a shielded and electrically filtered enclosure, the transformer will still be protected against geomagnetic induced GIC. Additional details regarding the contents of such an enclosure are discussed in further detail below.

In various embodiments, different types of electrical protection circuits could be used. In example embodiments, electrical protection circuits could include those described in copending U.S. patent application Ser. No. 13/159,374, entitled "Continuous Uninterruptable AC Grounding System for Power System Protection", the disclosure of which is hereby incorporated by reference in its entirety.

Referring now to FIG. 3, an example embodiment of a system 300 including an electrical protection circuit 302 electrically connected to the sensing and control system 310 of the present disclosure is shown. In this example embodiment, a Hall Effect current sensor could alternatively be used in place of the shunt resistor 206 of FIG. 2 (and current sensing device 314, described below) for measuring the DC current in the transformer neutral to ground connection. In such embodiments, the Hall Effect sensor would be sacrificed by either an EMP or IEMI attack. There is also a possibility that a Capacitive Voltage Transformer (CVT) (not shown) connected to a phase of the transformer 10, would likewise be sacrificed by an EMP or IEMI attack.

The sensing and control circuit 310 includes control electronics, such as a sensing and control module 312, as well as a current sensing unit 314. A relay control circuit 316 is connected to the sensing and control electronics 312, and generates a switch control output 313 used to actuate the switches 204 and 208.

The sensing and control module 312 senses harmonics which are generated in a half cycle saturated transformer under a GIC event. For example, the module 312 can include a harmonic sensor that will measure the signal from a standard capacitive voltage transformer (CVT) (not shown)

which is located on one of the transformer phases. When the signal from either of the neutral DC current or harmonic sensor exceeds a preset value, a signal is sent to open the two switches in the switching assembly 202. The preset values will be selected by the utility or power system engineers according to the protection requirements of each particular installation. The typical ranges for preset values of DC or quasi DC current are expected to be in the range of about 5-50 amps. The typical ranges for preset values of the power harmonic levels are expected to in the range of about 1% to 10% total harmonic distortion (THD). The current sensing circuit 314 measures neutral DC or quasi DC current caused by a geomagnetic storm across shunt resistor 206, and sends the result of that measurement to the sensing and control module 312 to trigger the relay control circuit 316 as necessary.

In the embodiment shown, the control circuit 310 is enclosed within a shielded enclosure 320, and includes a plurality of filters 322 positioned at a periphery of the enclosure 320 to prevent high frequency, high power electromagnetic radiation from entering the enclosure, thereby exposing the sensitive control and sensing electronics to potential interference and damage. The filters 322 can typically be a low pass or band pass filter with surge suppression to suppress any high voltage signals from entering the enclosure. In the embodiment shown, the shielded enclosure 322 is an EMP/IEMI faraday shielded enclosure with conductive gaskets around all door openings to provide radiative protection from electromagnetic frequencies typically from about 14 kHz to 10 GHz. Additionally, in the embodiment shown, a filter 322 is positioned on a power input 324, as well as on a CVT input 326, operator inputs and outputs 328, the switch control output 313, and current sensing inputs 330 connecting across either side of the shunt resistor 206. Additionally, any fiber communications in and out of the enclosure 320 will be filtered via an appropriate waveguide-beyond-cutoff frequency penetration, which will inherently provide protection against EMP and IEMI events.

In operation, when a GIC event is detected by the control circuit 310, the low DC voltage switch, i.e. switch 204, will be opened by the relay control circuit 316, via switch control output 313. Following this action a signal will open the high voltage grounding switch 208. The grounding switch 208 will then typically remain open for the duration of the geomagnetic storm event, typically on the order of a few hours to a day. During this period the DC blocking component 210, in this case capacitor 304, provides the AC ground for the transformer neutral 10 of transformer 12. The reclosing of the grounding switch 208 will typically be controlled by the operator of the power system after the geomagnetic storm has passed. However, some utility installations may prefer to configure their system to reclose the switches automatically, e.g., after a predetermined period of time.

To ensure that the transformer protection would continue its protection function under an EMP or IEMI attack, an Electromagnetic (EM) Field, a detector 352 could be added to this protection system as shown, connecting to the sensing and control electronics 312 via a filter 322. The detector 352 resides outside of the enclosure 320, and would allow the detection of either the EMP E1 or E2 pulse or an IEMI pulse which in turn would be used to open the switch assembly 202, including switches 204, 208 and hence switch in the necessary transformer protection. The EM detector 352 could be mounted on the top or side of the control house and be connected by a shielded conduit to the protected control electronics 310.

In various embodiments, different types of electromagnetic field detectors could be used as detector 352. In example embodiments, electromagnetic field detectors could include those described in copending U.S. patent application Ser. No. 12/906,902, entitled "Electromagnetic Field Detection Systems and Methods", the disclosure of which is hereby incorporated by reference in its entirety.

In operation, even if a Hall Effect sensor and/or the CVT (not shown) were damaged or destroyed by an electromagnetic event, the EM detector 352 would open the switch assembly 202 which in turn would protect the HV transformer 10.

The sensing and control system 310 of the present disclosure is contained within a shielded enclosure 320. The periphery of the shielded enclosure is lined by a plurality of filters 322 that are electrically connected to sensing and control electronics 312. In some embodiments, the sensing and control electronics include a harmonic analyzer 406, a plurality of threshold detectors 408, and a controller 410 as shown and further described in FIG. 4. The sensing and control electronics 312 sense potentially harmful harmonics and/or DC currents in a power line and operate the DC switch 204 and high voltage grounding switch 208 in the electrical protection circuit 302.

Figure 4:
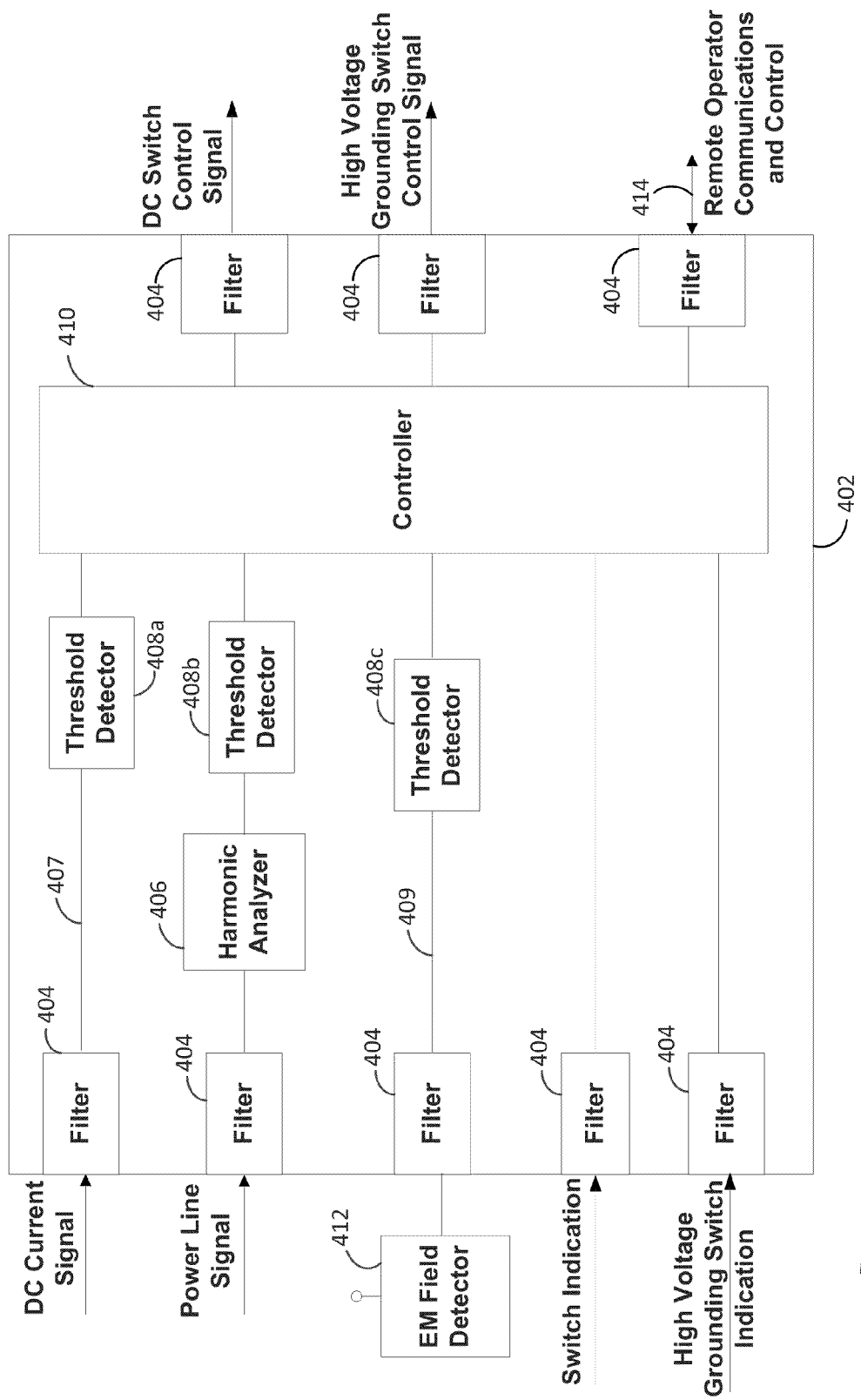
FIG. 4 is an example embodiment of the sensing and control system contained within a shielded enclosure including an external electromagnetic field detector.

Referring now to FIG. 4, a first generalized embodiment of the sensing and control system 400 of the present disclosure is shown. FIG. 4 illustrates a system for detecting a variety of different types of potentially harmful signals to the transformer 12 or other electrical equipment that is the subject of the present disclosure. In particular, the system includes a sensing and control system 400 that detects power harmonics, direct currents (as well as quasi-direct current signals), and EMP/IEMI events according to the present disclosure.

The sensing and control system 400 of the present embodiment includes a shielded enclosure 402 that contains a plurality of filters 404 lined along the periphery of the shielded enclosure 402. The sensing and control system 400 additionally contains an EM field detector 412 (e.g., analogous to detector 352 of FIG. 3) positioned outside the shielded enclosure 402 and is electrically connected to a filter 404. Each filter 404 is electrically connected to a threshold detector 408*a-c* (collectively referred to as threshold detectors 408), a harmonic analyzer 406, or directly to a controller 410. The output of the harmonic analyzer 406 is electrically connected to a threshold detector 408*b*. Each threshold detector 408*a-c* outputs a signal to a controller 410. The controller 410 sends signals remote from the shielded enclosure 402 through a plurality of filters 404.

In operation, the components in the sensing and control system 400 are contained within an EMP/IEMI shielded enclosure 402 that is configured to protect the sensing and control electronics from electromagnetic interference. The periphery of the shielded enclosure 402 is lined with a plurality of low pass or band pass filters 404 to prevent high frequency, high power electromagnetic signals from entering the enclosure that would expose the sensitive control and sensing electronics to potential interference and damage. The filters 402 are generally analogous to filters 322 of FIG. 3, described above.

In certain embodiments, the present disclosure includes a harmonic analyzer 406 located within the shielded enclosure 402 as discussed in more detail below. The harmonic analyzer 406 is another example of a detection component used to detect the total harmonic distortion (THD) on an incoming power line signal from the transformer 12. The harmonic analyzer 406 is electrically connected to the controller 410, described in further detail below.

In the embodiment shown, the plurality of threshold detectors 408*a-c* are each configured to compare an incoming signal indication from a detection component, such as an external electromagnetic (EM) field detector 412, to an adjustable predetermined threshold value. If the predetermined threshold value is exceeded, the corresponding threshold detector 408 will send a signal to a controller 410 also positioned within the shielded enclosure 402. The controller 410 is configured to drive at least one of the external components of the electrical protection circuit 200 such as a switch 204, as shown in FIG. 3. For example, if the DC or quasi-DC current through a shunt resistor 206 positioned between transformer neutral and ground exceeds the predetermined threshold value of the threshold detector 408, the threshold detector 408 will send an indication to the controller 410. The controller 410 will in turn send a signal through a filter 404 to open the normally closed switch 204 that is located between transformer neutral and ground in order to protect the high voltage transformer 12 from damage.

In the embodiment shown, each of the threshold detectors 408a-c can be configured to detect a different type of signal, or a signal received having a different triggering threshold. For example, threshold detector 408a, which is configured to detect a predetermined direct current above a predetermined threshold, can be configured to trigger controller 410 when above a first threshold, but detector 408b, which receives signals from harmonic analyzer 406, can be configured to trigger controller 410 upon detection of a different type of signal, or at a different signal threshold level. The same is true of threshold detector 408c, which receives signals from the EM field detector 412. In alternative embodiments, additional types of potentially harmful signals can be monitored and fed to a threshold detector for triggering controller 410.

Figure 5:
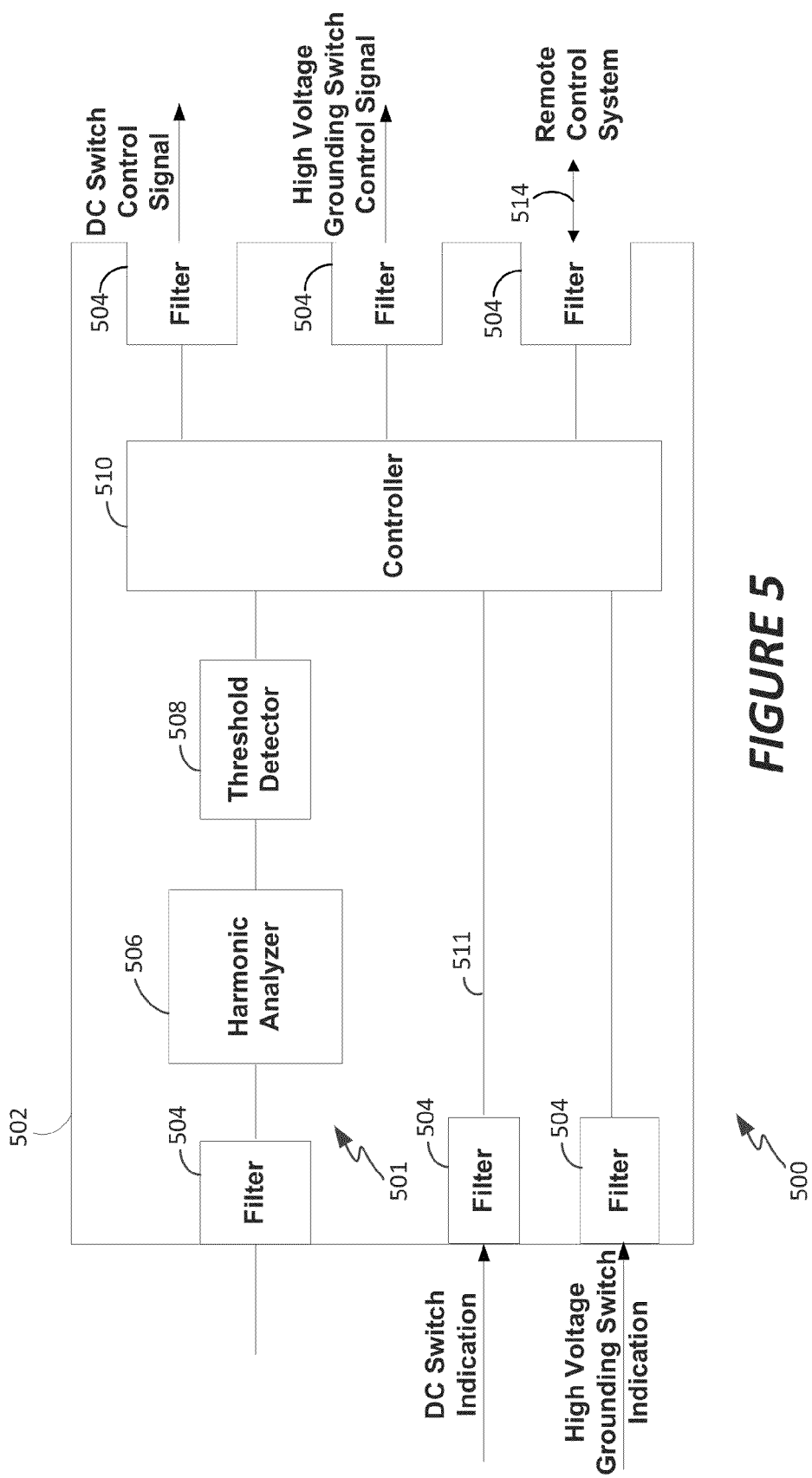
FIG. 5 is an example embodiment of the sensing and control system contained within a shielded enclosure.

The controller 410 can be any of a number of types of programmable circuits, and configured to generate a switching output signal in response to receipt of a signal from one or more of the threshold detectors 408a-c. In some embodiments, the controller 410 is a microprocessor configured for managing switching outputs based on programmable logic based on detection of a signal from either a threshold detector or a control input 414. In the embodiment shown, the control input 414 is electrically connected to the controller 410, and leads to a system controller remote from the shielded enclosure 402. The control input 414 may exchange data between the system controller and the controller 410, for example to communicate a history of switching events triggered by the sensing and control electronics, as well as to provide remote triggering and reset functionality. The control input 414 can also trigger execution of one or more self-test procedures configured to simulate potentially damaging signals for monitoring purposes. The controller 410 can, for example, test switch actuation based on switch indication and high voltage grounding switch indication inputs, as depicted. These self-test procedures are described more fully below. FIG. 5 illustrates an example embodiment of the present disclosure for detecting power harmonics in a transformer. The electronics 500 can be used, for example as a portion of the sensing and control electronics 400 of FIG. 4, or alternatively as a stand-alone element in situations where harmonic signals are of primary concern (rather than in combination with sensing of DC signals. This example embodiment includes a series of sensing and control components contained in a shielded enclosure 502 that is lined with a plurality of filters 504. These filters are analogous to the filters described in FIG. 4. The sensing components 501 include a filter 504, a harmonic analyzer 506, and a threshold detector 508. A filter 504, to reject conducted high energy electromagnetic pulses and intentional electromagnetic interference (IEMI), is electrically connected to a signal line extending into the shielded enclosure 502. The filter 504 is electrically connected to a harmonic analyzer 506 that outputs a signal to a threshold detector 508. The threshold detector 508 is electrically connected to a controller 510 also contained within the shielded enclosure 502.

In another example embodiment example, only a DC signal would be sensed in a transformer neutral to ground connection, for example in a situation where DC currents are of primary concern.

The present disclosure also includes a communications bus 514 that is electrically connected to the controller 510. The communications bus 514 leads to a system operator remote from the shielded enclosure 502. The communications bus 514 may also execute one or more self-test procedures configured to simulate potentially damaging signals for monitoring purposes. These self-test procedures are described more fully below.

In operation, the harmonic analyzer 506 receives a voltage signal from a CVT (not shown in the figures) located on one of the phases of the power transformer 12 through a filter 504. The harmonic analyzer 506 detects power harmonics in a transformer 12. The harmonics detected by the harmonic analyzer 506 are compared to an adjustable predetermined threshold value of a threshold detector 508. If the harmonics exceed the predetermined threshold value of the threshold detector 508, the threshold detector sends a signal indicating the threshold value has been exceeded to the controller 510 located within the shielded enclosure 502. In some embodiments the harmonic analyzer, threshold detector and controller are all implemented within a microprocessor. The controller 510 sends a switch indication signal through a filter 504 to open a DC switch, such as switch 204 of FIGS. 2-3, followed by a signal to open a high voltage grounding switch 208 to protect the transformer 12 and/or to provide electric power grid stability from potentially harmful DC currents in the transformer neutral and to reduce harmonics on the power line signal.

Figure 6:
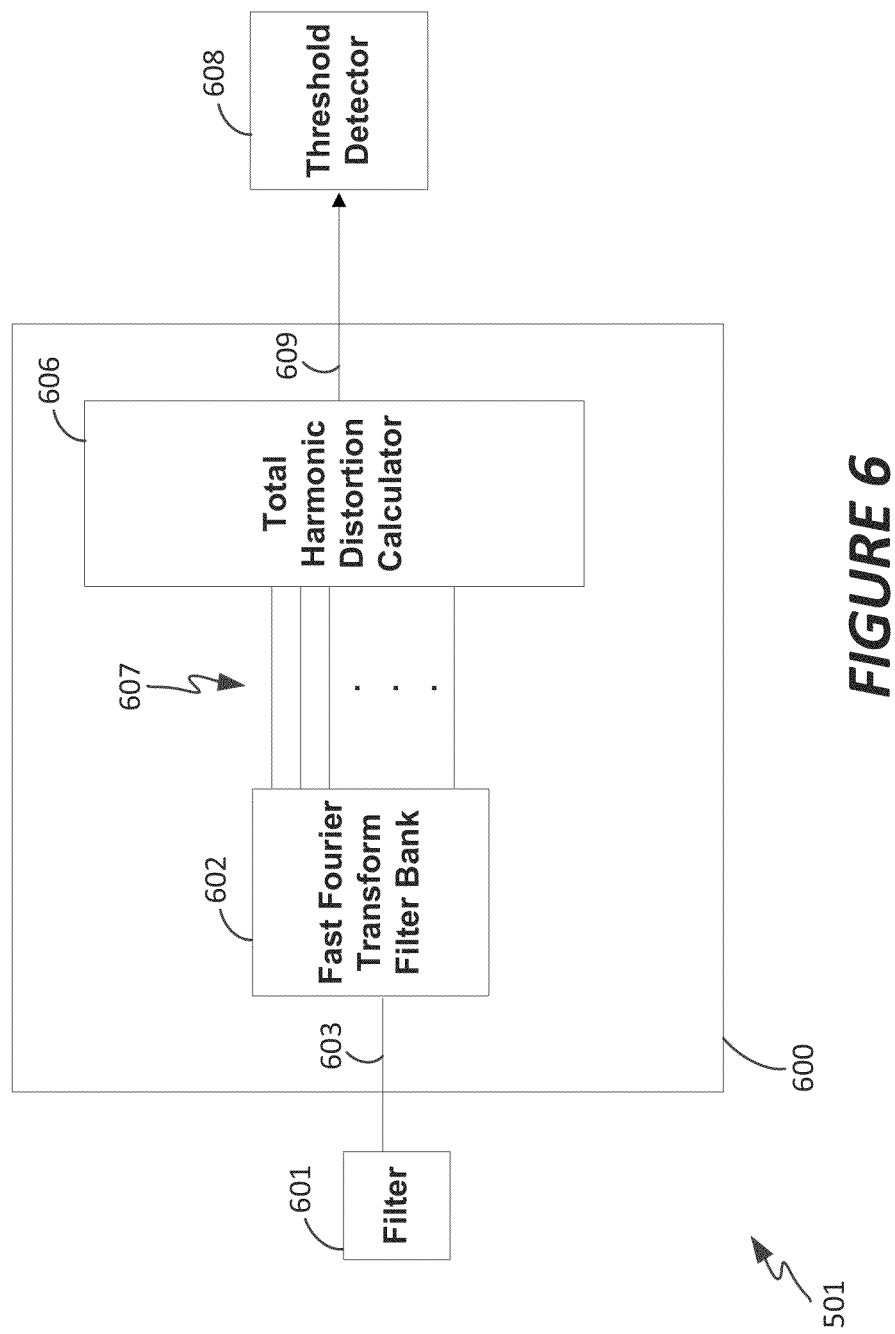
FIG. 6 is an example embodiment of the harmonic analyzer contained within the sensing and control system.
Figure 7:
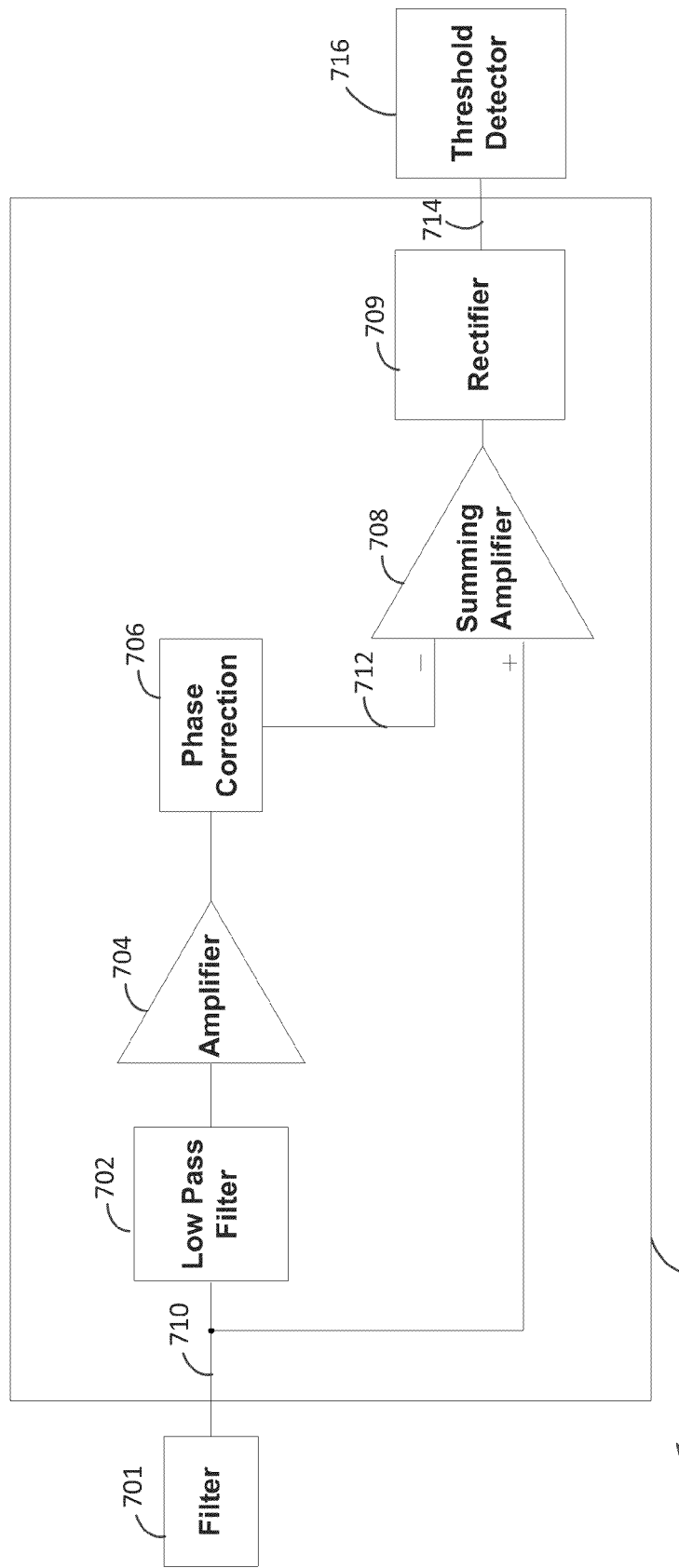
FIG. 7 is another example embodiment of the harmonic analyzer contained within the sensing and control system.
Figure 8:
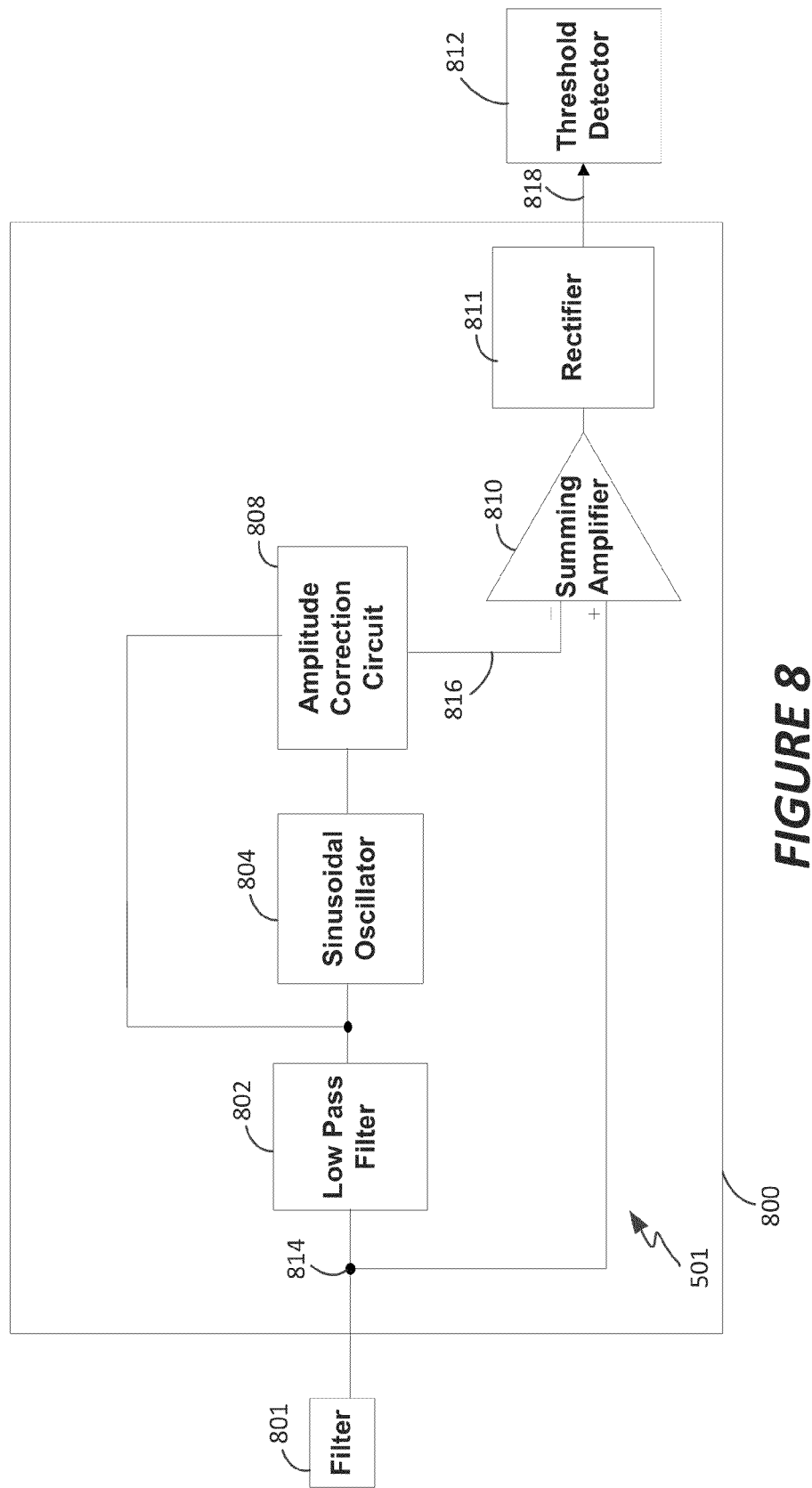
FIG. 8 is another example embodiment of the harmonic analyzer contained within the sensing and control system.

Referring now to FIGS. 6-8, various embodiments of sensing and control electronics including a harmonic analyzer useable in the systems of FIGS. 3-5 (e.g., as harmonic analyzer 406). FIG. 6 illustrates a first possible embodiment of a harmonic analyzer 600, useable as harmonic analyzer 406 as shown in FIG. 4 or harmonic analyzer 506 as shown in FIG. 5 for detecting power harmonics in a transformer 12. This embodiment uses a microprocessor 600 to compute a Fast Fourier Transform (FFT) to detect power harmonics in the power signal 603. This embodiment includes a microprocessor 800 that contains an FFT calculator 602, and a total harmonic distortion calculator 606. The FFT calculator 602 in the microprocessor 600 transforms the power line signal 603 into a plurality of frequency signals, acting as a bank of bandpass filters. The sample rate of the system and number of points in the FFT are set so that each of the harmonics of the harmonics of the input signal falls into a different filter bin, corresponding to a unique output index in the FFT. These signals 605 are separated into frequency bands 607 corresponding to a range of harmonics of the 60 Hz (or 50 Hz) power frequency using bandpass filters within the Fast Fourier Transform Filter Band 602. These harmonics are then used to calculate the total harmonic distortion (THD) 609 using a total harmonic distortion calculator 606 in the microprocessor 600.

This total harmonic distortion signal 609 is then compared to a preset threshold level in the microprocessor (e.g., illustrated as threshold detector 608) and if THD signal exceeds the present level a signal is sent to open the switch assembly, including switches 204 and 208.

FIG. 7 illustrates a further possible embodiment of a harmonic analyzer 700. The harmonic analyzer 700 can be used in place of harmonic analyzer 406 as shown in FIG. 4 or harmonic analyzer 506 as shown in FIG. 5, for detecting power harmonics in a transformer 12. The harmonic analyzer 700 is electrically connected between a filter 701 and a threshold detector 716. Collectively, these components comprise sensing components 501. This example embodiment of a harmonic analyzer 700 includes a low pass filter 702 electrically connected to an amplifier 704 and a phase correction module 706. The output of the phase correction module 706 is electrically connected to a summing amplifier 708. The output of the summing amplifier 708 is connected to a rectifier circuit 709, which adjusts the amplitude of the signal, resulting in a signal 714 proportional to total harmonic distortion.

In operation, this example embodiment of a harmonic analyzer 700 subtracts an unfiltered power line signal 710 from a filtered and phase shifted signal 712, which is then amplitude adjusted to output the total harmonic distortion signal 714. This example embodiment includes a low pass filter 702 configured to filter the noise of an unfiltered power line signal 710. From the low pass filter, the filtered power line signal passes through an amplifier 704 for amplitude adjustment. The signal then passes through a phase correction module 706 configured to synchronize the phase of the amplitude adjusted and filtered signal. The filtered, amplitude adjusted and phase shifted signal 712 is then compared to the unfiltered power line signal 710 at a summing amplifier 708. The summing amplifier 608 subtracts the two signals to output the power line harmonics 714 of the power line signal. The power line harmonics signal is then rectified at the rectifier circuit 709 to produce a voltage proportional to the THD on the power line. The total harmonic distortion signal 714 is then sent to a threshold detector 716, for comparison to the total harmonic distortion as explained above in connection with FIG. 5.

FIG. 8 illustrates another possible embodiment of a harmonic analyzer 800, useable as harmonic analyzer 406 as shown in FIG. 4 or harmonic analyzer 506 as shown in FIG. 5 for detecting power harmonics in a transformer 12. The harmonic analyzer 800 includes a power line signal electrically connected to a low-pass filter 801 and a threshold detector 812. This example embodiment of a harmonic analyzer 800 includes a low pass filter 802 electrically connected to a phase-locked sinusoidal oscillator 804. The oscillator 804 is used to produce a clean signal lacking harmonic content, that replicates the 60 Hz (or alternatively 50 Hz) power line signal. An amplitude adjustment circuit 808 adjusts the output of the oscillator 804 to match the expected power line signal frequency. The output of the amplitude adjusted, phase-locked sinusoidal oscillator 804 (from the amplitude correction circuit 808) is electrically connected to a summing amplifier 810. Finally, the output of the summing amplifier 810 is connected to a rectifier 811 to produce a signal 818 which is proportional to the total harmonic distortion (THD) on the power line. Collectively, these components comprise sensing components 801.

This example embodiment is similar to the harmonic analyzer 706 of FIG. 7, but uses a phase-locked sinusoidal oscillator 808 to generate a clean 120V, 60 Hz (or clean 240 V, 50 Hz) reference signal that is subtracted from the unfiltered power line signal 814. This alternative embodiment includes a low pass filter 802 configured to filter out the noise and harmonics of an unfiltered power line signal 814. The filtered signal is then used as a reference signal input to a phase-locked sinusoidal oscillator 804. The phase-locked sinusoidal oscillator 804 generates a clean 120V, 60 Hz signal 816 that is compared to the unfiltered power line signal 814 at a summing amplifier 810. The summing amplifier 810 and rectifier 811 output the signal 818 that is proportional to total harmonic distortion on the power line signal 814, and that is sent to a threshold detector 812.

Figure 9:
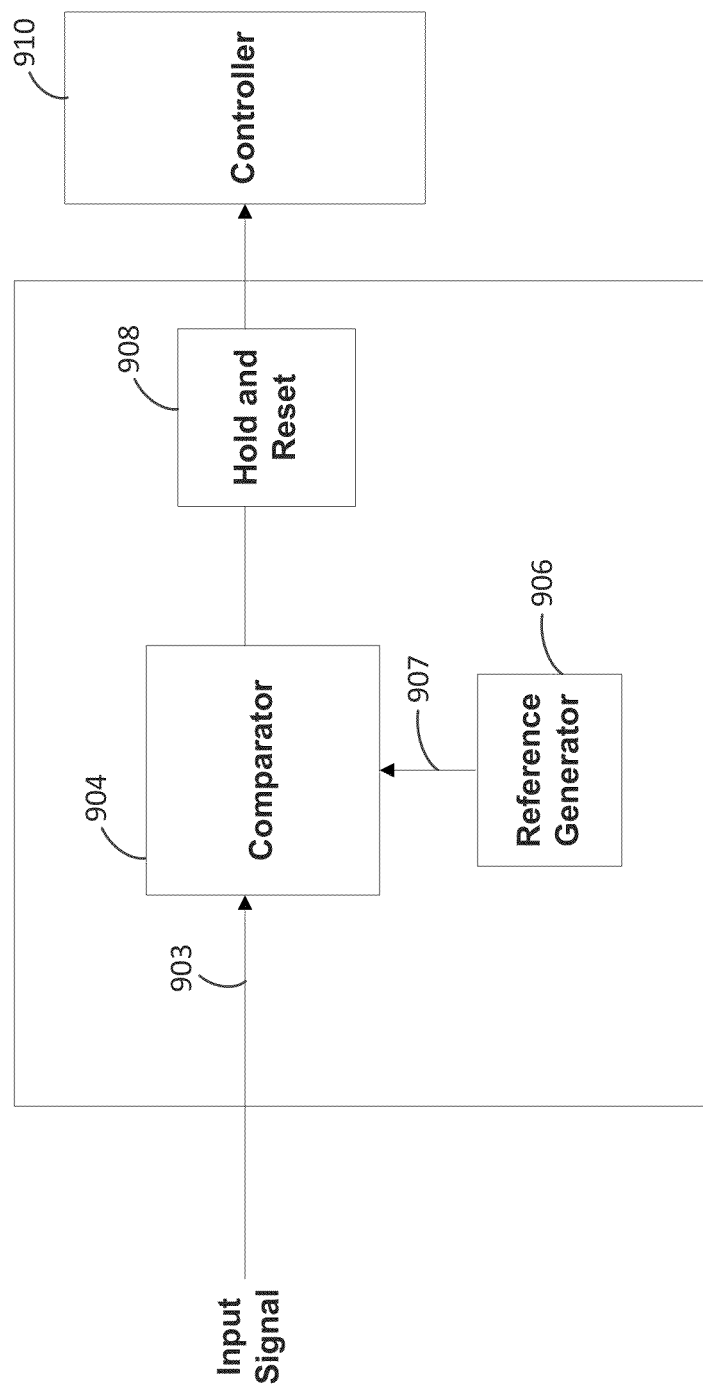
FIG. 9 illustrates an example embodiment of a threshold detector circuit contained within the sensing and control system.

FIG. 9 illustrates a possible embodiment of a threshold detector 900, useable as the threshold detector 408 as shown in FIG. 4 or threshold detector 508 as shown in FIG. 5 for comparing power harmonics and DC currents in a transformer 12. This example embodiment of a threshold detector receives harmonics or quasi-DC currents from a rectifier (e.g., rectifier 709 of FIG. 7 or 811 of FIG. 8) that is electrically connected to a comparator 904. The comparator 904 is electrically connected to a reference generator 906 and a hold and reset circuit 908. The hold and reset circuit 908 outputs a signal to an electrically connected controller 910 that is located external to the threshold detector 900.

In operation, the threshold detector receives harmonics or quasi-DC currents from an incoming power line signal or a harmonic analyzer 406. The comparator 904 compares the rectified signal 903 to a reference signal 907. The comparator 904 receives the reference signal 907 from an adjustable reference generator 906 that defines a harmonic distortion acceptable to the transformer 12. Upon a comparison between the reference signal 907 and the input signal 903, the comparator 904 generates a signal that can be captured at a hold and reset circuit 908. The captured signal is then sent to a controller 910 that can be used to trigger a switch 204 as shown in FIGS. 2-3.

Figure 10:
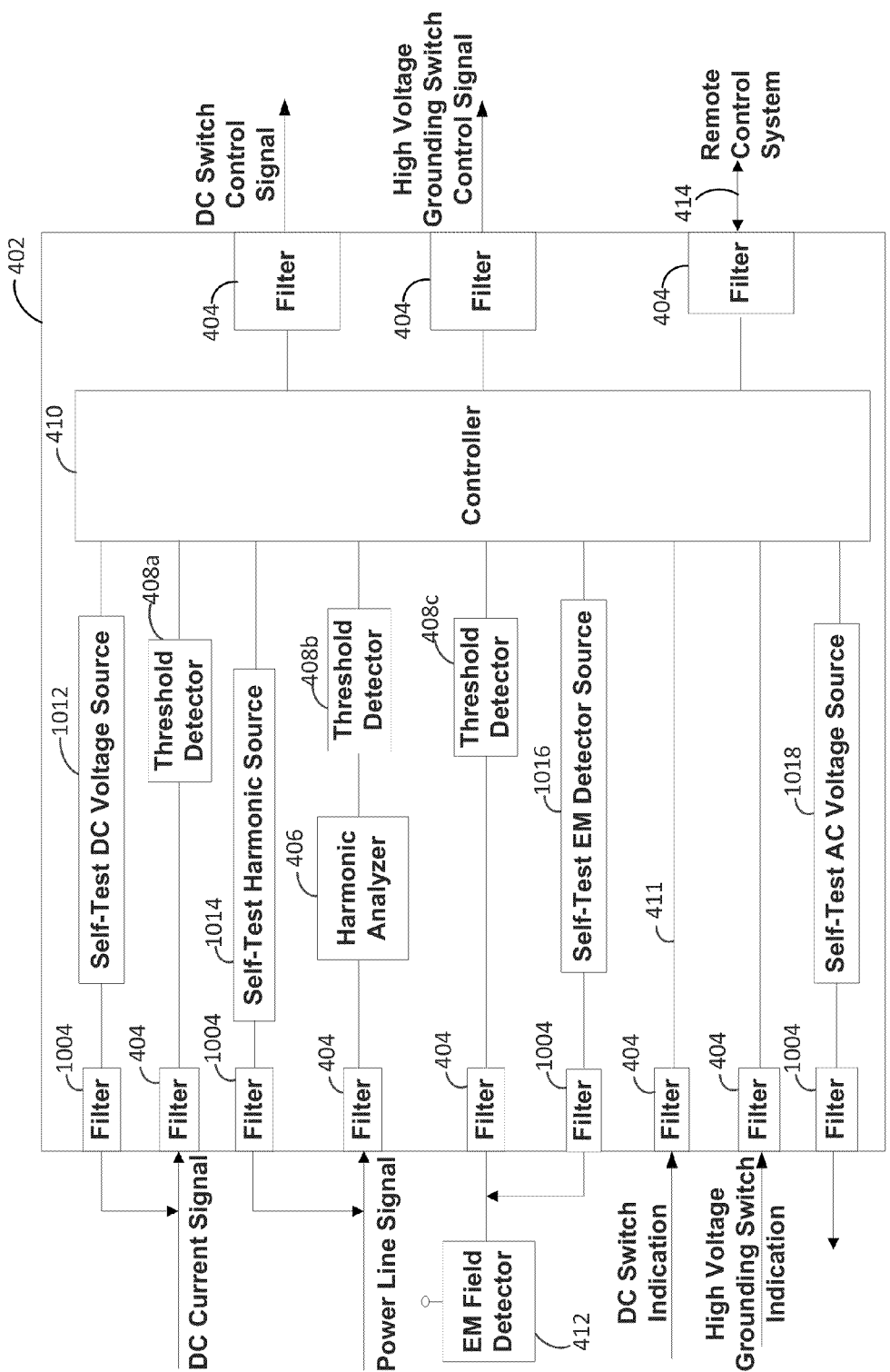
FIG. 10 illustrates an example embodiment of the sensing and control electronics including self-test functionality.
Figure 12:
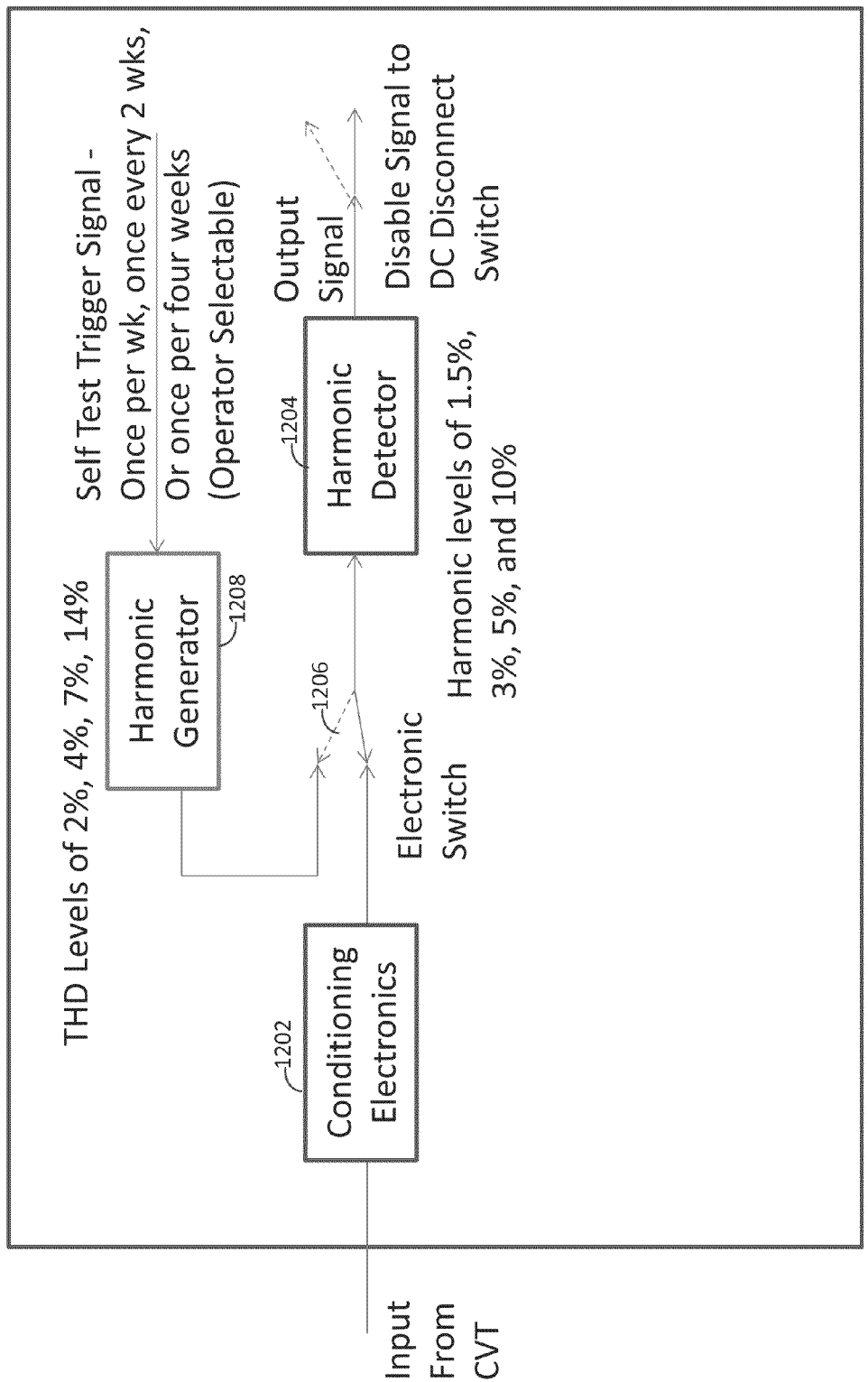
FIG. 12 illustrates an example implementation of a harmonic sensing arrangement incorporated into a sensing and control system.

FIG. 10 represents an example embodiment of the present disclosure of FIG. 4, but additionally includes self-test features to ensure proper system operation. This embodiment of the present disclosure includes a self-test DC voltage source 1012, a self-test harmonic source 1014, a self-test EM detector source 1016, and a self-test AC voltage source 1018 located within the shielded enclosure 402. In some embodiments, these self-test features are triggered automatically on a periodic basis by the controller 410. These self-test features can also be triggered by a user operating a control system located at a remote site from the shielded enclosure 402, or performed at a remote system, as illustrated in FIG. 12.

In the embodiment shown in FIG. 10, a self-test AC voltage source 1018 generates an AC signal with a frequency different from that received at the transformer 12. The AC voltage exits the shielded enclosure 402 through a filter 1004 and is applied to the transformer neutral 10. The electrical protection circuit 200 as shown in FIG. 2, in its normal operation mode, measures the magnitude of the current across a DC blocking device 210 based on a known amplitude of the AC signal generated by the AC voltage source 1018. The controller 410 compares the magnitude of the DC blocking device 210 with an expected value to determine whether the DC blocking component 210 is operating accurately.

Another self-test function within the present disclosure is a self-test DC voltage source 1012 that generates a direct current intended to simulate a direct current in the transformer neutral 10 to ground 14 connection. The generated direct current is outside the range of normal operation of the direct current in the transformer neutral 10 to ground 14 connection. The direct current generated by the self-test DC voltage source 1012 exits the shielded enclosure 402 through a filter 1004 and re-enters the shielded enclosure 402 through the direct current signal input. The generated signal is then passed through a threshold detector 408 for comparison to a known value that is acceptable to the transformer 10. If sensing and control system 1000 is operating properly, the controller 410 will trigger an indication signal that will exit the shielded enclosure 402 through a filter 404 to open a switch 204 in the electrical protection circuit 200. If the controller 410 does not open the switch 204, the controller 410 will send an error message to a remote control system external to the shielded enclosure 402.

Another self-test function within the present disclosure is a self-test harmonic source 1014 that generates a harmonic signal intended to simulate undesired harmonics on a power line signal. The generated harmonic signal exits the shielded enclosure 402 through a filter 1005 and re-enters the shielded enclosure 402 through the power line signal input. The signal is passed through a harmonic analyzer 406 that compares the generated harmonic signal to a known, acceptable frequency. If the sensing and control system 1000 is operating properly, the controller 410 will trigger an indication signal that will exit the shielded enclosure 402 through a filter 404 to open a switch 204 in the electrical protection circuit 200 as shown in FIG. 2. If the controller 410 does not open the switch 204, the controller 410 will send an error message to a remote control system external to the shielded enclosure 402.

In addition to the tests described above, various other self-tests can be performed using the circuitry of FIG. 10. For example, controller 410 can detect defects or variances in operation of circuitry of FIGS. 1-9, such as by detecting a rate of discharge of capacitors (e.g., capacitor 304), or other electrical characteristic of a DC blocking device 210 (a capacitor or other DC blocking element). In some example embodiments, the self-tests can include testing of surge arrester 212, for example to determine if the surge arrester 212 has previously experienced a pressure relief mode. For example, the self-test can detect whether the surge arrester has a particular voltage range; before a pressure relief mode has occurred, the voltage range can be from 0 to 15 kV and current range can be 0-60 kA, with a duration of about ¼ cycle; after the pressure relief mode occurs, the voltage range would be about 0 to 1 kV and current of about 0 to 1 kA for about 6 cycles.

In still further embodiments, other types of tests and monitoring could be performed. For example, as discussed further below in connection with FIG. 15, the monitoring of a spark gap conduction duration could be monitored and recorded. In such cases, a spark gap state can be tested, for example by determining whether voltages of 0-7 kV have been detected, and for less than ¼ of a cycle; in such cases, no spark is formed. However, if a voltage of 0-2.4 kV (asymmetric) and 0 to 1 kV rms (symmetric) with 0 to 60 kA (asymmetric) or 0 to 25 kA rms (symmetric) have been found, a spark gap has formed.

Figure 11:
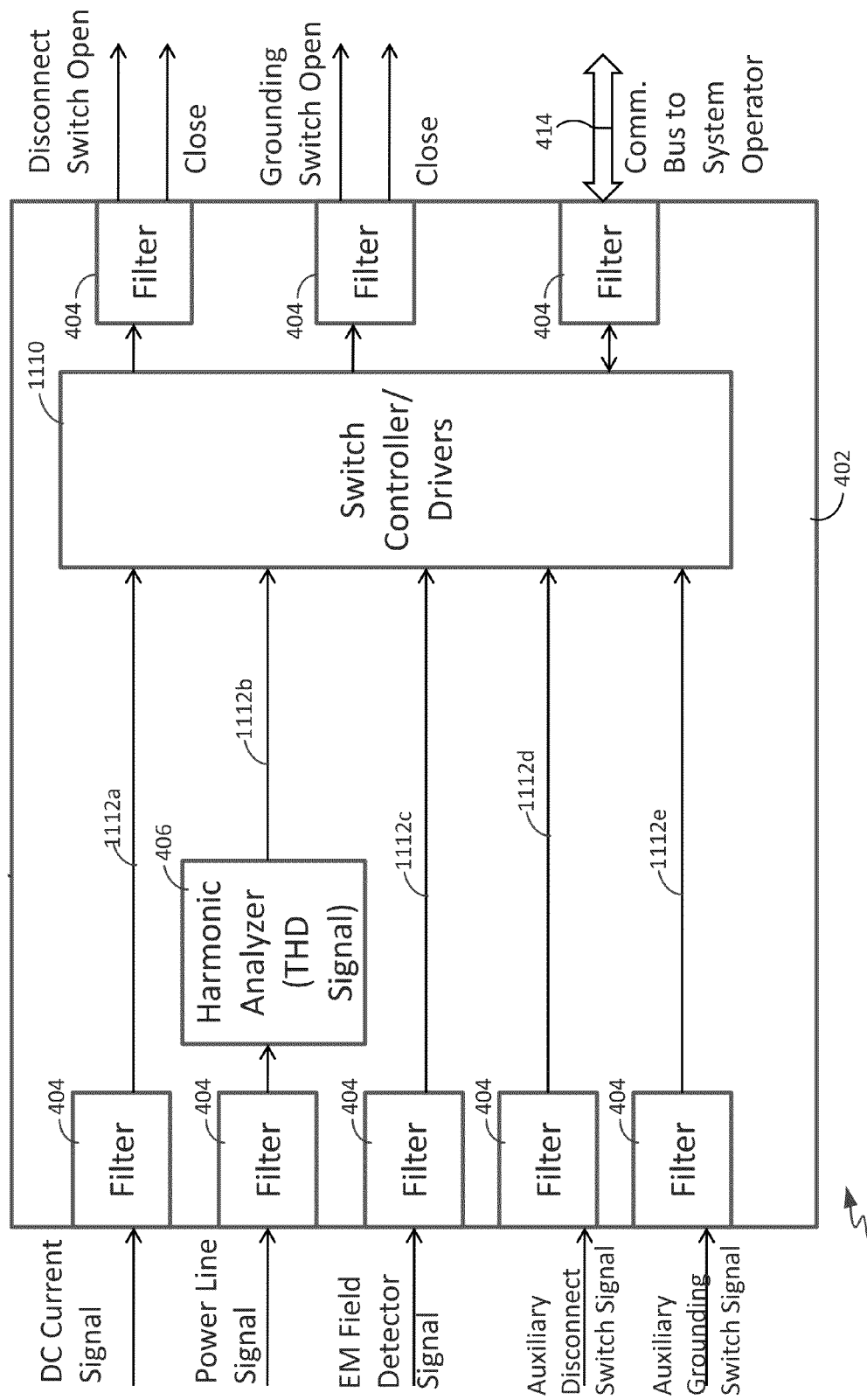
FIG. 11 is an example embodiment of the sensing and control electronics including monitoring and alarming functionality.

Referring now to FIG. 11, an alternative arrangement 1100 of self-test functionality is illustrated, in conjunction with the sensing and control electronics. In general, the alternative arrangement 1100 generally corresponds to the circuitry 400 of FIG. 4, but has incorporated into a controller 1110, also referred to as sensing and control electronics, a number of the self-test functions described in connection with FIG. 10, above, as well as other self-test and monitoring functions. In particular, the sensing and control electronics contain a number of additional functions/features; namely, monitoring, alarming, and automatic controls. In one example system, the controller 1110 is used to monitor various voltage or current parameters, as well as switch positions in a high voltage transformer protection system, such as the one described in copending U.S. patent application Ser. No. 13/159,374, entitled "Continuous Uninterruptable AC Grounding System for Power System Protection", the disclosure of which was incorporated by reference in its entirety above. In the embodiment shown, the arrangement 1100 additionally contemplates a remote parameter settings capability by the operator, as further discussed below.

In general, the arrangement 1100, rather than including threshold detectors 408a-c as illustrated in FIGS. 4 and 10, implements monitoring, alarming, and self-test systems into the controller 1110. In particular, signals 1112a-e are directed to the controller 1110 to be measured with sample and hold firmware, software or hardware within the switch controller/driver (or digital signal processor) for a set time duration. In example implementations, the sample and hold firmware within the controller 1110 samples the parameter to be monitored at a sufficiently high rate, for example 1 kHz or higher, and detects peak signal values over a preset duration (e.g., one second, or some other duration). These peak values can then be transmitted over a fiber or other bus onto the utility SCADA or other control system remote from the arrangement 1100 at an analogous (e.g., one Hertz) rate. Some of the parameters that can be monitored include, for example: a peak quasi-DC current in the transformer neutral; peak total harmonic distortion (THD); peak value of a detector such as an EMP or IEMI detector; power source, typically 120 volts DC, from the batteries in the sub-station house; peak value of the current in the transformer neutral current transformer (CT) signal; position of the DC disconnect switch; position of the high voltage AC switch (also referred to as an AC Grounding Switch); and the peak signal from any other parameter in the system or the position of any other switches or equipment in the overall system described herein or in copending U.S. patent application Ser. No. 13/159,374.

In example embodiments, the controller 1110 also incorporates alarm functions capable of being communicated to a system operator. For example, if one of the above monitoring parameters exceeds a preset threshold value, an alarm is either sounded or transmitted to a remote system, so that an operator can take action to ensure the system is operating as intended and as designed. The controller 1110 may also trigger an alarm if one of the switches is not in a correct position according to the desired mode of operation.

In some embodiments, the controller 1110 also includes built-in automatic controls to command the system to sequence through the various modes of self-testing. Such automatic control will reside in a digital signal processor or other type of micro-controller incorporated into the controller 1110.

The controller 1110 can, in some embodiments, also have a function which automatically returns the system back to its normal operation after a GIC event is experienced. With this feature, the controller 1110 can return one or more of the switches in a circuit to a normally-closed mode after being in the GIC protective mode. In various implementations, this can occur after a preset time delay for example one, three, six or twelve hours, and is adjustable in time by a remote operator. Should the GIC event still be present, the controller 1110 will receive an indication of that event on lines 1112a-e, and will once again automatically go into the GIC protective mode, opening the switches to which it is connected (e.g., switches 204, 208).

In some embodiments, the controller 1110 can communicate with and can also be controlled by a utility system operator sending commands through the controller 1110, for example to either open or close the DC disconnect switch or the high voltage AC switch, or to trigger operation of one or more of the self-test operations, such as are described below in connection with FIGS. 12-14, or above regarding FIG. 10.

The various settings in the overall arrangement 1100 can also be set or readjusted remotely by a system operator. These settings may include trigger thresholds for the various sensing inputs, for example the quasi-DC current, the total harmonic distortion (THD), the EMP/IEMI detector signal, neutral AC rms (root mean squared) voltage trigger level, the signal processing delay for the GIC command generation (0.5 or 1, or 3 or 5 seconds), the neutral rms current trigger levels (50, 100, 200, 400 amperes), or the harmonic detection bandwidth settings (for example 300, 600 or 1,200 Hz).

The system operator, either locally to or remote from the arrangement 1100, can also put the controller 1110 (and therefore the electrical protection circuit 200 of FIG. 2) into the GIC protective mode when a geomagnetic storm is anticipated or forecasted by an agency such as NOAA that a solar storm is expected.

The utility operator can also initiate a self-test sequence as needed. However, this function will automatically be deactivated should the electrical protection circuit 200 and associated controller 1110 be in the GIC protective mode.

In some embodiments of the self-test arrangements of FIGS. 10-11, some or all of the self-test features may be excluded or modified. For example, in FIG. 11, the controller 1110 can be configured to perform only a subset of the tests discussed above, including DC and AC signal tests, or tests of various switches incorporated into circuit interfaced to arrangement 1100 (e.g., circuits illustrated in FIGS. 1-9, or FIG. 15, below). Furthermore, as discussed above with respect to FIG. 10, additional tests of discrete circuit components, rather than sensing subsystems, could be performed as well.

Figure 13:
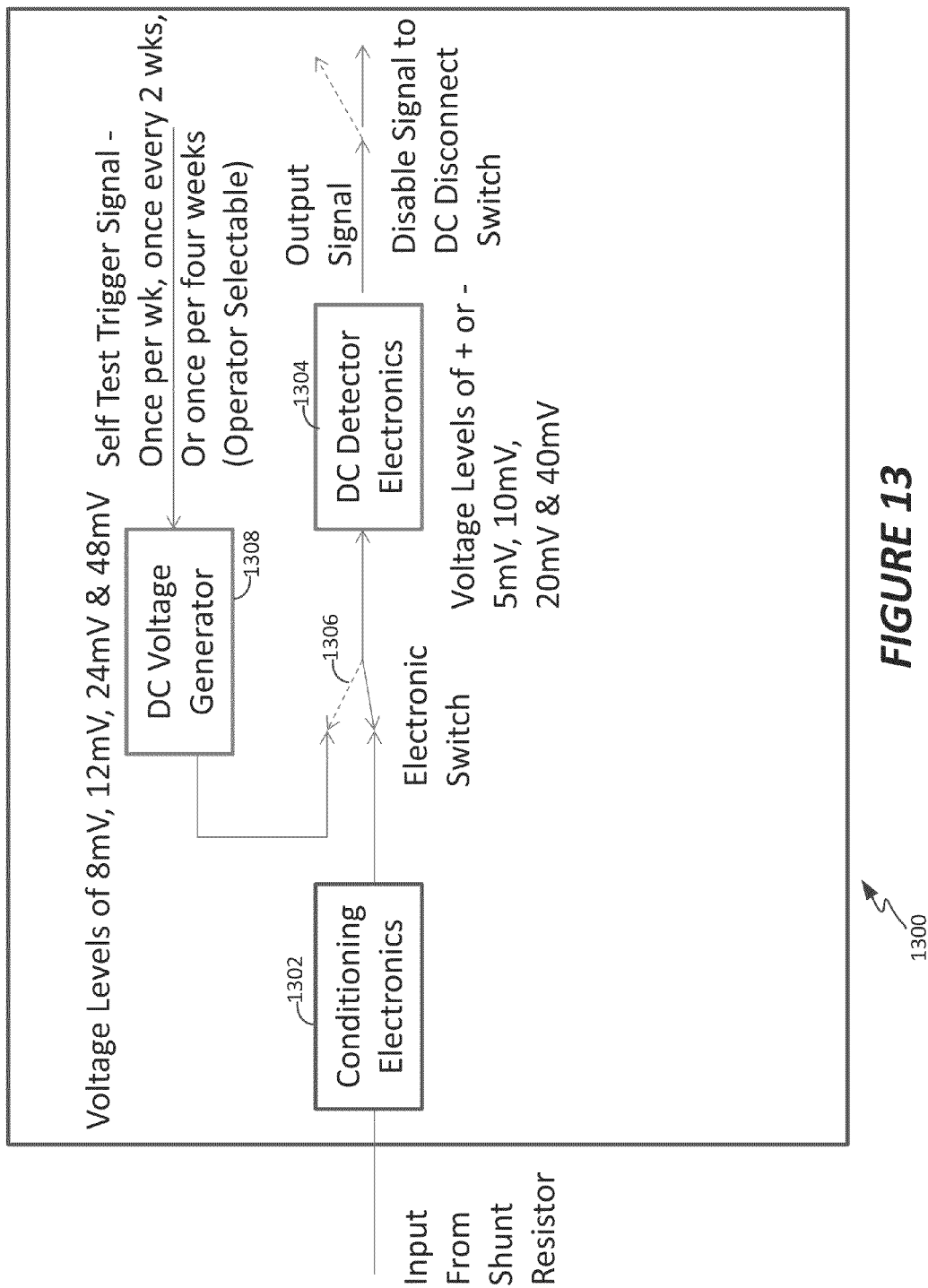
FIG. 13 illustrates an example implementation of a neutral direct current sensing and self-test arrangement incorporated into a sensing and control system.
Figure 14:
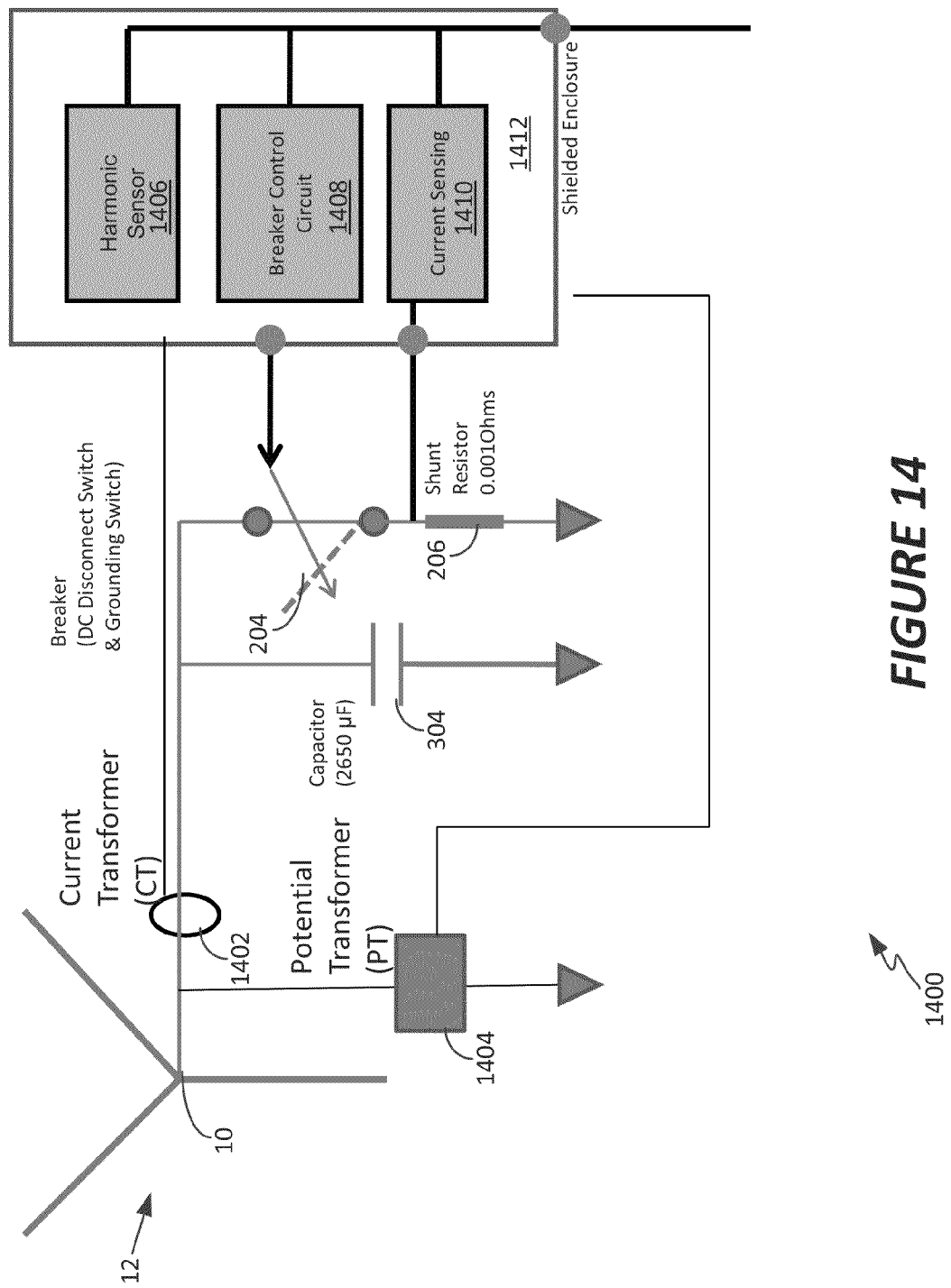
FIG. 14 illustrates an example implementation of a circuit in which a neutral impedance measurement and self-test arrangement can be incorporated, as associated with a sensing and control system.

Referring now to FIGS. 12-14, specific implementations of a self-test arrangement incorporated into a sensing and control system, such as the arrangement 1100 of FIG. 11 or within a remote SCADA system, are described. In various embodiments, one or more of the self-test procedures described herein can be performed on a selectable, regular basis, such as weekly, semi-weekly, monthly, or some other period. In such testing sequences an internal real-time clock with long life battery can be used as a timer for the arrangement 1100.

When performing the one or more self-test operations, the controller 1110 is configured to disable all monitoring and alarm functions, disable switch control functions (i.e. not sending signals to open the GIC power switches when in the self-test mode), and initiate a series of tests. In one example embodiment, the controller 1110 will initiate a harmonic self-test mode, starting at a preset time (e.g., about 2 seconds) after the monitoring and switch control disabling operations. In general, the harmonic self-testing is used to determine an overall, total harmonic distortion measurement by way of firmware and/or control electronics. The controller 1110 will test harmonic signals, for example using the harmonic self-test mode 1200, as illustrated in FIG. 12. As seen in that figure, normally the controller 1110 receives an input from a capacitive voltage transformer (CVT) (or CVTs located on each arm of a three-phase transformer) is passed to conditioning electronics 1202, and to a harmonic detector 1204. In a self-test mode, a switch 1206 is used to connect a test signal from a harmonic generator 1208, which is triggered within the controller 1110 or from a remote operator, based on a periodic schedule. The signal amplitude from the harmonic generator 1208 is adjustable to a variety of levels of a fundamental amplitude, for example to about 2%, 4%, 7%, and 14% that respectively correspond to the adjustable trigger level settings of the harmonic detector 1204, which in this example are 1.5%, 3%, 5%, and 10% of the fundamental amplitude. Note the harmonic generator amplitude selections (for example 2%, 4%, 7% and 14%) could be automatically ganged with the appropriate harmonic detector trigger levels (for example 1.5%, 3%, 5% and 10%) to ensure that the corresponding test amplitude is consistent with the corresponding detector trigger level setting.

In example embodiments, a detected harmonic signal is in the frequency range 0-1,200 Hz. As such, the controller 1110, or analogous SCADA system, could use a fast fourier transform to measure the total harmonic distortion, and can use adjustable bandwidths of about 300, 600, and 1,200 Hz. In such cases, the above threshold trigger levels could be used; alternatively, continuously adjustable trigger levels of 0.3% to 10% could also be used. The triggers can occur if the total harmonic distortion level for any of the three phases of the transformer 12 is exceeded for a predetermined amount of time. In some cases, the amount of time is continuously adjustable, and can be between about 0.05 and about 5 seconds.

The response of the harmonic detector 1204 is observed in response to the generated signal for a period of time (e.g., 3 seconds), and a confirmation message is then returned to a remote system indicating that the harmonic signal is in fact detected (e.g., via DNP3 and web protocols). It is noted that the harmonic signal is not passed onto the switch control outputs, so that the self-test does not trigger some different operation of the switching functionality (i.e., switches 208, 210) of the system. Output from monitoring electronics will cause a DC breaker, such as breaker 1506 of FIG. 15, below, to be opened, either by controller 1110 or by a remote SCADA system.

After the harmonic test is complete, and after some additional delay (e.g., an additional two seconds), a neutral direct current self-test mode is entered, for example using one or more programmed modes such as are illustrated in the arrangement 1300 depicted in FIG. 13. As illustrated in that figure, the controller 1110 will initiate a direct current self-test mode. In the self-test, rather than receiving a signal from a shunt resistor (e.g., resistor 206) via conditioning electronics 1302 at a direct current detector 1304, a switch 1306 selects to receive a direct current voltage from a DC voltage generator 1308, which outputs positive or negative voltages of a variety of magnitudes. For example, the DC voltage signal generated by the DC voltage generator 1308 can be adjustable to 8 mV, 12 mV, 24 mV & 48 mV. These voltage levels would be ganged with the associated DC detector trigger levels of +/−5 mV, +/−10 mV, +/−20 mV and +/−40 mV. The detector 1304 receives and detects the various voltage levels, and a confirmation message is then returned to a remote system indicating that a DC voltage is in fact detected (e.g., via DNP3 and web protocols). In various embodiments, the DC voltage applied is a quasi-DC voltage of about 0-10 Hz, and is measured in the presence of a 60 Hz AC voltage having a magnitude of about 0-200 mV. Trigger levels indicating that a direct current signal is present can be set to continuously adjust, to detect DC voltages of +/−1 to +/−50 mV, and would trigger in the event the set voltage is exceeded for about 0.05 to about 5 seconds (also in a continuously adjustable setting. It is noted that a direct current disconnect signal is not passed onto the switch control outputs, so that the self-test does not trigger some different operation of the switching functionality (i.e., switches 208, 204) of the system, as with the harmonic self-test above. Output from monitoring electronics will cause a DC breaker, such as breaker 1506 of FIG. 15, below, to be opened, either by controller 1110 or by a remote SCADA system. After the direct current self-test mode is completed, various monitoring functions can be employed, for example through use of a neutral impedance self test mode depicted in an arrangement 1400 illustrated in FIG. 14. The arrangement 1400 generally represents a schematic of particular test signals determined based on the circuit 200 of FIG. 2, above. In particular, the neutral impedance self-test mode is intended to validate the monitoring circuit for the neutral AC (60 Hz) rms voltage and current. In a normal mode, the arrangement 1400 will detect a current range of about 0.2 to 200 amps (rms AC at 60 Hz) at a current transformer 1402, and a voltage range of about 0.2 to 200 mVolts (rms AC at 60 Hz) at a potential transformer 1404. Generally, an alarm should be signaled when the neutral impedance (i.e., voltage/current) is about 20% higher or lower than a preset, adjustable value. This allows the system to determine positions of breakers within the system, such as whether those breakers are open or closed, as well as the positions of auxiliary breaker contacts. Additionally, voltages can be monitored, for example the quasi-DC current value across the shunt resistor 206, a DC current at the transformer neutral 10, or AC currents as discussed above in connection with FIG. 12. Additionally, an alarm is signaled if the 60 Hz rms neutral current signal drops below a preset level (e.g., adjustable 0.05, 0.1, 0.2, 0.4 ampere settings) for a preset period (e.g., adjustable 10, 20, 40, 80 second periods). In connection with the present disclosure, the controller 1110 or SCADA system can periodically poll the above parameters via, for example, a DNP or Web protocol.

During normal operation the circuit monitors a 120 volt DC signal provided by station batteries. If this direct current signal drops below 100 volts for more than a minute, one or more alarms are generated. Auxiliary switch contacts are monitored, and, along with the harmonic measurements (THD), and the DC voltage measurement are sent to a remote system approximately every five seconds.

Also during normal operation, the current and voltage signals are passed to the controller 1100, represented by the functional blocks of the harmonic sensor 1406, breaker control circuit 1408, and current sensor 1410 within the enclosure 1412. In a GIC protection mode, a current range is about 0.2 to 200 amps (rms AC at 60 Hz), peak rms at the current transformer 1402 (with a switch in a 30 db attenuation position to handle higher voltages), and a voltage range of about 0.4 to 400 Volts (rms AC at 60 Hz) at the potential transformer 1404. To test the capacitor and resistor impedance of the components 304, 206, respectively, any switches included in the circuit (including switch 204 as depicted in FIG. 14) are opened. As above, any alarms for a nonfunctioning component are generated and optionally transmitted to a remote system.

In addition to the above remote setting operations, it is noted that each of the self-test trigger levels for the various self-test operations described above can be remotely set by the operator. For example, a remote user can set four harmonic detection levels and test levels, with optional detection levels of 1.5%, 3%, 5%, or 10%, and optional testing levels of 2%, 4%, 7%, or 14%. Additionally, a remote user can set any of three harmonic detection bandwidth options, for example 300 Hz, 600 Hz or 1200 Hz. In still further remote operation embodiments, a remote user can set the four DC voltage detection levels and test levels, with detection levels of +/−5, +/−10, +/−20, +/−40 or +/−80 millivolts, and testing levels of 8, 13, 24, 48 or 96 millivolts. In still other examples, a remote user can set the initial time delay for initiating the GIC protection mode, for example from among time delays of 0.5, 1, 2, and 5 seconds. The remote user can also set the neural rms voltage (60 Hz) alarm levels, for example at 70, 140, 280, and 560 Hz. The remote user can also set the neutral rms current (60 Hz) alarm levels, for example at levels of 50, 100, 200, and 400 Hz.

Figure 15:
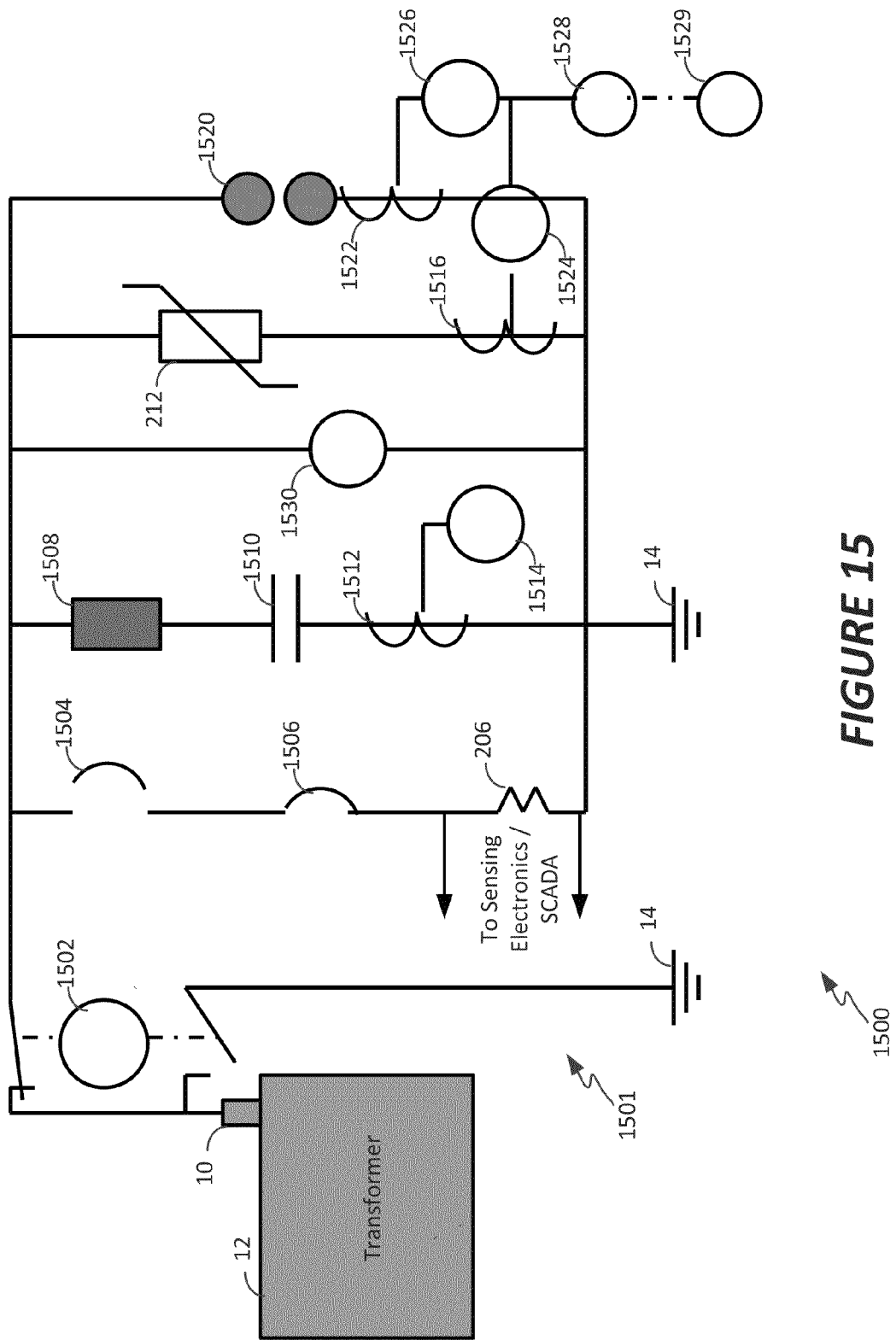
FIG. 15 illustrates an example embodiment of an electrical protection circuit external to the control system of the present disclosure.

Referring to FIG. 15, a further arrangement 1500 is shown in which an electrical protection circuit 1501 is interfaced to a neutral 10 of a transformer, to provide grounding of the neutral 10 in the event of harmful signals derived from GIC (solar storms) and EMP E3 pulses. The circuit 1501 includes a key interlock 1502 used to selectively provide a locking connection of the transformer neutral 10 to ground 14. Additionally, and similar to the arrangement of FIGS. 2-3, an AC breaker 1504 is positioned in series with a DC breaker 1506 and shunt resistor 206. The AC breaker 1504 is, in a default embodiment, in an open position, preventing AC grounding of the neutral 10. The DC breaker 1506 is by default in a closed position, and configured to switch open in the event of a large DC current between the transformer neutral 10 to ground 14, as previously described, and explained in U.S. patent application Ser. No. 13/159,374, entitled "Continuous Uninterruptable AC Grounding System for Power System Protection", the disclosure of which was incorporated by reference in its entirety above. The shunt resistor 206 provides an interface across which sensing electronics can be connected (e.g., sensing electronics such as are shown in FIGS. 10-11, or electrically connected to or integrated with a SCADA system as discussed above in connection with FIG. 1).

In the embodiment shown, a parallel path between the transformer neutral 10 and ground 14 includes a power resistor 1508 in series with a capacitor bank 1510, and further in parallel with a current transformer 1512, which has a control monitor 1514. The power resistor 1508, in some embodiments, corresponds to an approximately 1 ohm power resistor configured for large current applications, and useable to limit current occurring based on discharging from the capacitor bank 1510. The capacitor bank 1510 has, in the embodiment shown, a 2.4 kVolt charging capacity, and a one ohm reactance, thereby allowing the capacitor bank 1510 to provide quick reactivity to changes occurring in the circuit. Current transformer 1512 can be used to control current passing through the capacitor bank 1510, with monitor 1514 controlling a step-up/down of the current transformer 1512.

Similar to the arrangement of FIG. 2, a surge arrester 212, such as a metal oxide varistor, can be used to manage surge events between the transformer neutral and ground, and can be connected in series with a further current transformer 1516, managed by monitor 1524. Additionally, a spark gap 1520 can be connected between the transformer neutral and ground 14, also separated from ground by a current transformer 1526 (which is also controlled by monitor 1526). In an example embodiment, the spark gap will fire at about 8 to 9 kVolts, although other thresholds could be used as well. Example operation and design of such a spark gap is described in U.S. Provisional Patent Application No. 61/817,762, the disclosure of which is hereby incorporated by reference in its entirety. It is noted that typical GIC protection events will pass through the surge arrester 212, while high voltage events may trigger operation of the spark gap 1520. A thyristor 1528 can be used to trigger operation of the current transformers, while a lockout 1529 prevents protective operation of the overall unity by deactivating the current transformers, thereby disconnecting the transformer neutral 10 and ground 14 (in a default case).

In addition to the above, in the embodiment shown, a voltage probe 1530 can be connected between the transformer neutral 10 and ground 14 as well, to monitor an instantaneous voltage level at the transformer neutral.

It is noted that, in connection with the arrangement recited in FIG. 15, particular test operations could be performed based on use of one or more test inputs that can lead to either sensing and control circuitry (e.g., as in FIGS. 10-11) or to SCADA systems used for remote monitoring and control (e.g., as in SCADA system 110 of FIG. 1). For example in one embodiment, a plurality of current transformer inputs could be tested at each of three phases to detect harmonics that occur. A further current transformer input allows for monitoring current through the breaker assembly including circuit breakers 1504, 1506. A still further current transformer input 1516 can be used to monitor current through the surge arrester 212, and a further current transformer input 1526 can obtain current through the spark gap 1520. Additional current transformer inputs could be added for use with different circuit configurations.

In addition to the current transformers, voltage inputs could be used to detect voltages across the circuit 1501. For example, current inputs across the shunt resistor 206 could be used to sense and set DC current and harmonic set points. An additional voltage input could be located at the transformer neutral for direct monitoring. Additional voltage inputs could be added for use with different circuit configurations.

In addition to the voltage inputs, various power and breaker inputs could be provided and tested as well. For example, a voltage input from a power station at which the transformer is located could be monitored (e.g., a 120 V DC signal). Additionally, contact positions, such as auxiliary contact positions of both the AC and DC breakers 1504, 1506, respectively, could be tested.

In connection with the present disclosure, a number of self-test signals can be transmitted to the circuitry 1501 from associated circuitry or SCADA systems to detect and verify correct operation of the circuitry discussed herein. For example, the self-testing system (not shown, but discussed above as integrated into a control electronics system or SCADA system) can transmit the following signals to the circuit 1501:

(1) a signal to open the DC breaker 1506, which in turn causes the AC breaker 1504 to open. In this case, the control system, whether from arrangements 1000, or 1100, or from an analogous SCADA system, can send a signal to close the AC breaker 1504, and output monitoring signals from system electronics to a remote SCADA System (e.g., system 110);

(2) a harmonic signal detected from current transformers located on the phases of the transformer 12;

(3) a position of the AC and DC breakers 1504, 1506 (i.e., open or closed status);

(4) a current voltage level (AC or DC) across shunt resistor 206;

(5) a voltage (AC or DC) derived from the voltage probe 1530, directed to a voltage at transformer neutral 10;

(6) an AC current through the capacitor bank 1510;

(7) an AC current through the surge arrester 212, as defined by current transformer 1516; and (8) an AC current through the spark gap 1520, based on current transformer 1522.

The various tests occurring in the circuit 1501 of FIG. 15 can be, for example, those discussed above in connection with FIGS. 10-14. In addition to the above tests, further testing can be performed on the arrangement 1500 using a SCADA system (e.g., system 110 of FIG. 1) to determine other types of faults occurring in the system. For example, an AC current through the shunt resistor 206 can be monitored to determine if there is a neutral current over 180 amps for over a minute. This amount of current would cause damage to the power resistor 1508. In such embodiments, the SCADA system connected to the arrangement 1500 could send an alarm to a user or local system to deactivate the overall system. Additionally, the SCADA system can determine if impedance across the power resistor 1508 and capacitive network 1510 is within a tolerance range when the breaker assembly (AC breaker 1504 and DC breaker 1506) are in a normal operating position, as well as when the breaker assembly is in a GIC protective mode. In such cases, the SCADA system and/or control electronics can return the breakers 1504, 1506 to a normal mode after a preset time delay. This preset time delay can be variable between about 10 and 720 minutes, and is remotely adjustable.

In addition to the self-test operations discussed in connection with FIGS. 10-15, it is noted that a number of operator controls can be included as well, for use either locally at a control system or via a SCADA system located remotely from the current transformer 12 being monitored. In some embodiments, a system operator can selectively switch an overall system into or out from a GIC protective mode by opening the DC breaker 1506 and closing the AC breaker 1504. Additionally, the operator can remotely set harmonic detection levels explained above, remotely set harmonic detection bandwidths (for example, among the 300 Hz, 600 Hz, and 1,200 Hz levels), remotely set a DC voltage detection level or time delays for triggering the GIC protection mode. It is further noted that, in some embodiments, fewer than all of the self-test operations can be performed at any given time, and that in some embodiments the self-test operations are not performed in direct succession. Various timings can be set for each of the self-test operations as well, consistent with their descriptions above in connection with FIGS. 11-15. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system comprising:
a protection circuit electrically connected to a transformer neutral, the transformer electrically connected to a power grid, the protection circuit including a DC blocking component positioned between the transformer neutral and ground and one or more switches selectively actuated to form a path between the transformer neutral and ground in the event of unwanted DC current at the transformer neutral;
a control circuit electrically connected to the protection circuit and positioned to selectively actuate the switches based on observed conditions within the protection circuit;
a plurality of test connections disposed within the protection circuit and useable to test electrical properties of the protection circuit; and
a plurality of detection components electrically connected to one or more electrical signal lines leading from one or more connection points on a power grid;
wherein the control circuit comprises a controller positioned within an interior volume of an electromagnetically shielded enclosure and receiving an output from each of the plurality of detection components, the controller including a plurality of test thresholds, and configured to drive at least one circuit component electrically connected to the transformer neutral in response to sensing a signal from one of the plurality of detection component of a detected harmonic or direct current signal above a respective one of the plurality of test thresholds.

2. The system of claim 1, wherein the protection circuit is electrically connected to a SCADA system remote from the protection circuit and control circuit, and wherein the SCADA system is electrically connected to the plurality of test connections for remote testing of electrical properties of the protection circuit.

3. The system of claim 1, wherein the plurality of detection components are selected from a group of detectors consisting of:
- a harmonic analyzer;
- a shunt resistor electrically connected between the transformer neutral and a ground;
- a Hall effect current sensor connected across a grounding line, the grounding line connected between the transformer neutral and a ground; and
- an electromagnetic field detector.

4. The system of claim 3, further comprising:
- a shielded enclosure having an interior volume, the shielded enclosure configured to shield the interior volume from electromagnetic interference;
- a plurality of filters positioned along a periphery of the shielded enclosure and connected to the electrical signal lines, the electrical signal lines extending into the interior volume from external to the shielded enclosure, the filters configured to prevent high frequency, high power electromagnetic signals from entering the shielded enclosure.

5. The system of claim 4, wherein the harmonic analyzer is positioned within the shielded enclosure.

6. The system of claim 5, wherein the shunt resistor is positioned external to the shielded enclosure.

7. The system of claim 6, wherein the Hall Effect current sensor is positioned external to the shielded enclosure.

8. The system of claim 7, wherein the electromagnetic field detector is positioned external to the shielded enclosure.

9. The system of claim 1, wherein the controller is configured to open a normally-closed switch connected between the transformer neutral and a ground connection.

10. The system of claim 1, wherein the controller is configured to open the normally-closed switch upon detection of a harmonic or direct current signal above a threshold on the transformer neutral.

11. The system of claim 1, wherein the indication received from at least one of the plurality of threshold detectors represents a detected harmonic, a direct current signal, or an electromagnetic pulse above a threshold associated with that threshold detector.

12. The system of claim 11, wherein the controller is configured to, during normal operation of the system, communicate status information regarding signals received from each of the detection components to the remote system.

13. The system of claim 12, wherein the system is located at a power substation, and wherein the remote system is located at a central control station and includes the SCADA system.

14. The system of claim 1, wherein the controller is configured to execute one or more self-test procedures, the self-test procedures configured to confirm that the system operates as expected in the event of damaging of degrading events.

15. The system of claim 14, wherein the one or more self-test procedures are selected from a group of procedures consisting of:
- applying an alternating current signal at the transformer, the alternating current signal having a frequency different from that of the power system frequency;
- applying a harmonic signal at a harmonic analyzer, the harmonic signal having an amplitude above the preset threshold defined by a threshold detector associated with the harmonic analyzer, the threshold defining a range of amplitudes;
- applying a direct current (DC) voltage signal at the transformer neutral to simulate direct current received at the transformer neutral and
- applying an electromagnetic (EM) detector signal, the EM signal having an amplitude above the preset threshold defined by a threshold detector, the threshold defining a range of amplitudes.

16. A method comprising:
- transmitting one or more electrical signals from a protection circuit to a remote system, the protection circuit electrically connected between a transformer neutral of a transformer in a power grid and ground, wherein the remote system periodically assesses operation of the protection circuit based on the one or more electrical signals; and
- receiving at a control circuit electrically connected to the protection circuit one or more commands from the remote system to actuate one or more switches in the protection circuit, thereby testing an alternative configuration of the protection circuit;
- receiving a plurality of detector signals at a controller forming a portion of the control circuit, the controller housed within an electromagnetically-shielded enclosure, and the detector signals including a harmonic detector signal and a direct current detector signal;
- sampling each of the plurality of detector signals to detect a peak value over a predetermined period;
- comparing each of the peak values to a corresponding remotely-set test threshold associated with that signal type, and, based on that comparison, generating one or more alarms if the remotely-set test threshold is exceeded; and
- communicating at least the one or more alarms to the remote system.

17. The method of claim 16, further comprising communicating each of the peak values to the remote system.

18. The method of claim 16, further comprising periodically performing one or more self-test procedures, the self-test procedures configured to confirm that the controller and electrical protection circuit operate as expected in the event of damaging of degrading events.

\* \* \* \* \*